US011849705B2

(12) United States Patent
Symes et al.

(10) Patent No.: US 11,849,705 B2
(45) Date of Patent: Dec. 26, 2023

(54) SYSTEMS AND METHODS FOR MEASURING BEEHIVE STRENGTH

(71) Applicant: The Bee Corp, Indianapolis, IN (US)

(72) Inventors: Ellie W. Symes, Indianapolis, IN (US); Wyatt C. Wells, Indianapolis, IN (US); Gretchen M. Riggs, Indianapolis, IN (US); Gleb A. Alexeev, Indianapolis, IN (US); Jordan Gaeta, Indianapolis, IN (US); Michael Meyer, Indianapolis, IN (US); Tyler Horoho, Indianapolis, IN (US); Robert Long, Indianapolis, IN (US); Dipak Rimal, Indianapolis, IN (US)

(73) Assignee: The Bee Corp, Indianapolis, IN (US)

( * ) Notice: Subject to any disclaimer, the term of this patent is extended or adjusted under 35 U.S.C. 154(b) by 0 days.

(21) Appl. No.: 17/689,915

(22) Filed: Mar. 8, 2022

(65) Prior Publication Data
US 2022/0245937 A1 Aug. 4, 2022

Related U.S. Application Data

(63) Continuation of application No. 16/780,663, filed on Feb. 3, 2020, now Pat. No. 11,301,679.
(Continued)

(51) Int. Cl.
*A01K 29/00* (2006.01)
*A01K 47/06* (2006.01)
(Continued)

(52) U.S. Cl.
CPC ........... *A01K 29/005* (2013.01); *A01K 47/06* (2013.01); *H04W 84/18* (2013.01)

(58) Field of Classification Search
None
See application file for complete search history.

(56) References Cited

U.S. PATENT DOCUMENTS

2010/0198023 A1* 8/2010 Yanai .................... A61D 99/00
702/19
2015/0366169 A1* 12/2015 Jiang .................... A01K 47/00
449/20
(Continued)

FOREIGN PATENT DOCUMENTS

CN 105145410 A * 12/2015 ............ A01K 47/06
CN 107549052 A * 1/2018
(Continued)

*Primary Examiner* — Mohammed Rachedine
(74) *Attorney, Agent, or Firm* — Ice Miller LLP

(57) ABSTRACT

Technologies for monitoring beehives in an apiary includes one or more sensors communicatively coupled to a remote data analysis computing device, which is communicatively coupled to a client computing device. The sensors are configured to monitor beehives and/or the environment of the apiary and transmit the sensed data to the remote data analysis computing device. The remote data analysis computing device is configured to analyze the received sensor data, determine whether to perform an action as a function of a result of the analysis, and perform the function, as applicable. The client computing device is configured to interface with the remote data analysis computing device such that a user of the client computing device can view results of the data analysis and actions, as well as provide input and adjust settings administered by the remote data analysis computing device. A model for assessing beehive strength from an infrared image is also disclosed. Other embodiments are described herein.

19 Claims, 15 Drawing Sheets

Related U.S. Application Data

(60) Provisional application No. 62/800,276, filed on Feb. 1, 2019.

(51) Int. Cl.
  *H04W 84/18* (2009.01)
  *G06F 3/16* (2006.01)

(56) References Cited

U.S. PATENT DOCUMENTS

| | | | |
|---|---|---|---|
| 2017/0079249 A1* | 3/2017 | Chapa | G01J 1/42 |
| 2020/0167835 A1* | 5/2020 | Michel | G06Q 40/08 |

FOREIGN PATENT DOCUMENTS

| | | | | |
|---|---|---|---|---|
| CN | 207135954 U | * | 3/2018 | |
| CN | 109145032 A | * | 1/2019 | A01K 67/033 |
| CN | 111272211 A | * | 6/2020 | |
| WO | WO-2015185899 A1 | * | 12/2015 | A01K 47/00 |
| WO | WO-2018165051 A1 | * | 9/2018 | A01K 47/06 |

* cited by examiner

Hive 2

| temperature | humidity | location |
|---|---|---|
| 57.0% | 71.3 % | good | hive location

MARK AS COMPLETE

Hive Notes  ADD HIVE NOTE all Technology Beekeeping
12/08/2017 Beekeeping
we too 5.01 and put it with 5.02 going to check them Tuesday(8/22) and get the down to two bood boxes for winter they have four on them now.
thnk they will make it through winter now. Wasn't looking good the way they were.
12/08/2017 Beekeeping
5.03 and 5.04 both had queens in the (debatable,
5.03 was probably queenless); 5.03 had no brood in it.
so we took 5.03 and put it with 5.04
12/08/2017 Beekeeping
Jill came over sunday we combined two hives: 5.01 (into 5.02 and 5.03 (into 5.04)
12/08/2017 Technology
the modem was moved to the front center of the hive yard.
The original distance was between 25-30' from the furthest hive. Thought this might help you with subsequent installs.
12/08/2017 Beekeeping
I released the queen, at least I think so, about 11a Wednesday.
The bees were quite grumpy and all over me.
12/08/2017 Technology
Brought a new hive out and intalled sensor S12.

VIEW OLDER NOTES

New Alerts

APR OGPS
18   Hives have been moved.

Old Alerts

APR 5:09PM  Queen's Guard          Completed on
18   Queen might be dead or has left the hive. Check hive ASAP   07/18/2017 at 5:09PM MAY 5:09PM  Queen's Guard          Completed on
07   Varroa mites are being given a serious look because CCD.   07/18/2017 at 5:09PM JUN 5:09PM  Queen's Guard          Completed on
21   Hive is not ventilating properly. Check hive and prop up top   07/18/2017 at 5:09PM
     cover to increase ventilation.

Fig. 8

SYSTEMS AND METHODS FOR MEASURING BEEHIVE STRENGTH

RELATED APPLICATIONS

This application is a continuation of U.S. patent application Ser. No. 16/780,663, which was filed on Feb. 3, 2020 and entitled SYSTEMS AND METHODS FOR MEASURING BEEHIVE STRENGTH, which claims the benefit of U.S. Provisional Application No. 62/800,276, filed Feb. 1, 2019, the contents of which are incorporated by reference herein in their entirety.

BACKGROUND OF THE DISCLOSED EMBODIMENTS

Honeybee populations have been in decline since the 1980s, and the term "Colony Collapse Disorder," was coined in 2007 to describe the troubling state of the bees. Beekeepers in the past could rely on 10-15% hive losses (i.e., bee mortality rates) each year, which was perceived as a sustainable loss percentage. Today, beekeepers are experiencing an average hive loss rate of 30% each year, with hive loss rates reaching nearly 50% in some regions, which has resulted in a fairly significant decrease in honey production over the last couple of decades. Diverse beekeeping beliefs (i.e., decision-making regarding hive management) have contributed to the hive loss rates, typically with little to no actual data being used to support hive management practices.

Additionally, beekeepers generally do not keep an accurate accounting of the information associated with their apiaries (e.g., the condition of the hives, bee counts, environment conditions, losses, etc.). Further, current research on honeybees relies on self-selection citizen science, and is limited to the qualitative information supplied by beekeepers, which, as noted, can be largely inaccurate. In this field, there is a general lack of quantitative data on the ecology and production efficiency of apiaries and the bees/hives contained therein. Therefore, there is a need for improved technologies for monitoring and analyzing data of beehives in an apiary.

SUMMARY OF THE DISCLOSED EMBODIMENTS

In one embodiment, a communications and control system and method for monitoring information about a plurality of beehives is provided. In one aspect of an embodiment of such a system, information or data is measured or otherwise observed, such as using suitable sensors, regarding the bees, and/or the beehives, and/or the environment around the beehives, or other relevant data or information. Such information measured may include one or more of temperature(s) at different points on or in the hive, gas (such as oxygen, carbon monoxide, and/or carbon dioxide gases) or other material or toxin levels, infrared or other wavelength information, weight and/or mass, activity level, decibel or other noise level measures, humidity levels, pressure, activity such as may be measure by movement or another visual measure, GPS or similar data regarding physical location, altitude, orientation or relative orientation, and other information or data as would occur to one of ordinary skill in the art regarding the beehive, bees, their activity, health, stress or other beehive effects.

In one embodiment, the sensors sense and transmit or store the data or information. Information may be stored at the beehive for later use, processing, or collection. The data or information may be collected through a variety of methods using a variety of systems and components well known in the art, such as automated or manual collection, pushing the information using a transmitter located at the beehive. Such data or information may be processed at the beehive or may be processed using devices or systems as disclosed in this disclosure or as would be known to one of ordinary skill in the art. The information may be processed at one or more of at the beehive, at another beehive that is in the same apiary or is separate from the beehive, and using other devices or systems remote from the beehives.

Other information and data can also be manually gathered or input, accessed, observed or collected relating to environmental conditions at or near each beehive and/or group of beehives. Such information may include the information described above, and/or other information such as wind speed and/or direction, precipitation type and amount, crop information (such as crop type and related data, plant location, plant density, crop yield information whether aggregate or by location in an orchard, field or plot), pesticide, fertilizer, and/or irrigation type, quantity and rate information, planting and harvest information, and other agricultural information. Such information and other data may be collected or accessed through other systems (such as farm implements and separate agricultural monitoring systems on the farm or orchard, or from other available databases or measurement/monitoring systems).

In one embodiment, the system and method may be configured to perform calculations and analyses. Calculations and analyses may be manual, automated, and may be performed using manually developed functions, predetermined or stablished functions, or machine learning. Such calculations and analyses may include for example recommended density or relative location of beehives placed for pollination in an orchard or in a field or plot, effectiveness or net yield change in a given crop, pesticide and/or fertilizer usage as a function of hive health, activity or other beehive information, In one embodiment, the system and method may be configured to generate and/or communicate reports. Such reports may include graphs, charts, lists, and other displays known to those of ordinary skill in the art. Such reports may include data, analyzed data, results of calculations and other derived information from the data and information gathered or accessed as described herein.

In one embodiment, the system and method may be configured to generate and communicate suggestions, recommendations, or instructions such as physical movement of one or more beehives to a new and/or particular location in an apiary or group of beehives placed for pollination or relative to a portion of crops, replacement of a beehive, collection of honey in a beehive, replacement of a queen, inspection, repair, or maintenance of hive structural or sensor or other components as disclosed herein, and other actions to be taken whether automatically or manually by a famer, worker or beekeeper, and whether directly or remotely. These suggestions may be based on observed data and information gathered or may be based on analyses or calculations of such data.

In one embodiment, the system and method may be configured to generate and communicate actions. Such actions can be communicated by or within parts of the system, including those disclosed herein or as would be understood by one of ordinary skill in the art, and may illustratively include such actions that adjust a physical characteristic of a beehive such as changing beehive orientation, activating or positioning windscreens, activating or positioning sunscreens, opening ventilation equipment or doors, activating smoke, water, food, nutrients, medication, or other devices for providing a supply to the bees in or around the beehive.

In one aspect, a method for monitoring and analyzing data of beehives in an apiary includes receiving, by a remote data analysis computing device, sensor data from one of a plurality of sensors associated with the apiary; analyzing, by the remote data analysis computing device, the received data; determining, by the remote data analysis computing device, whether to perform an action as a function of a result of the analysis; and performing, by the remote data analysis computing device and in response to a determination the action is to be performed, the action.

In some embodiments, analyzing the sensor data comprises to analyze the data using one or more machine learning algorithms. In other embodiments, analyzing the sensor data comprises to analyze the data using one or more regression analysis methods. In still other embodiments, the method further comprising aggregating, by the remote data analysis computing device, the received data with previously received sensor data from at least a portion of the plurality of sensors, wherein analyzing the received data includes analyzing the aggregated data.

In some embodiments, the method further comprising comparing, by the remote data analysis computing device, the result of the analysis to one or more threshold values, wherein determining whether to perform the action as a function of the result of the analysis comprises determining whether to perform the action as a function of the comparison. In some embodiments, performing the action in response to a determination the action is to be performed comprises performing the action in response to a determination the result of the analysis meets or violates one or more threshold values. In other embodiments, performing the action comprises transmitting a message to a corresponding data monitoring application, wherein the message includes information related to the action that is usable to display to a user of the corresponding data monitoring application. In still other embodiments, performing the action comprises transmitting a command to an actuator of the apiary, wherein the command is usable by the actuator to adjust a physical characteristic of a beehive by positioning of a mechanism attached to the actuator. In yet other embodiments, performing the action comprises transmitting an email to an email address, wherein the email includes information related to the action that is usable to indicate to notify a user of the action. In still yet other embodiments, performing the action comprises transmitting a text message to a phone number, wherein the text message includes information related to the action that is usable to notify a user of the action.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 8 is the user interface of FIG. 7 including a map.

DETAILED DESCRIPTION OF THE DISCLOSED EMBODIMENTS

Figure 1:
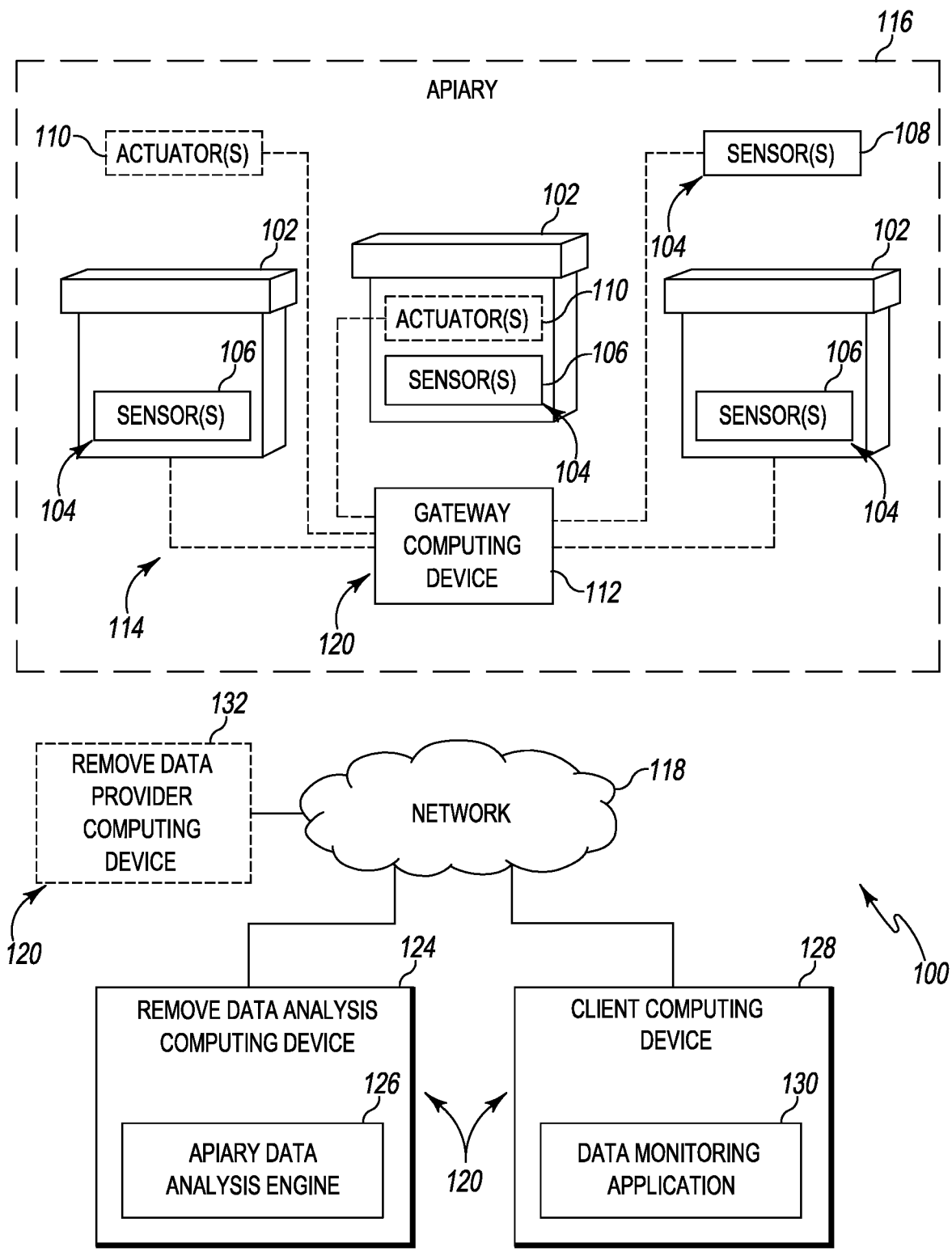
FIG. 1 is a schematic block diagram of a system for using sensor data to monitor beehives in an apiary that includes multiple sensors located within the apiary which are communicatively coupled to a remote data analysis computing device that is communicatively accessible by a client computing device.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a system 100 for monitoring an apiary 116, or "bee yard," that includes a number of beehives 102 using multiple sensors 104 located within the apiary 116. Although the term bee yard or apiary is used herein, it is understood that the beehives in this disclosure do not have to be of a single apiary or in any close proximity to one or more other beehives of the system or method, and that the term apiary is intended to cover any number of one or more beehives that are to be monitored and part of the system and method described herein.

As illustratively shown, each of the sensors 104 are communicatively coupled to one or more computing devices 120 either directly or over a network 118. The illustrative computing devices 120 include a gateway computing device 112, a remote data analysis computing device 124 (e.g., a cloud computing device), a client computing device 128, and a remote data provider computing device 132. It should be appreciated that additional and/or alternative computing devices 120 may be included in other embodiments.

The sensors 104 are configured to collect data of the environment in which they are deployed (e.g., internal or external to the beehives 102) and transmit (e.g., via messages, network packets, etc.) the collected data to the remote data analysis computing device 124. To do so, the sensors 104 are configured to transmit the collected data to the gateway computing device 112 over a wireless, cell, satellite, or other suitable network 114. In turn, and the gateway computing device 112 is configured to forward the collected data received from the sensors 102 to the remote data analysis computing device 124 via the network 118.

As will be described in further detail below, the remote data analysis computing device 124 is configured to monitor the data collected by and received from the sensors 104 to determine whether a condition exists such that an action should be taken (e.g., harvesting the produced honey from one or more of the beehives 102, attaching one or more supers to one or more of the beehives 102, moving/placing/repairing/replacing one or more of the beehives 102, adjusting a feeding schedule, etc.). In an illustrative example, the remote data analysis computing device 124 may be configured to determine locational placement of one or more of the beehives 102 within the apiary 116 in an effort to maximize honey production efficiency and/or reduce bee mortality rates.

The beehives 102 may be embodied as any type of enclosed structure in which a colony of honey bees is intended to live within. The beehives 102 may be configured as any type of artificial beehive 102, typically based on regional locale, such as, but not limited to, a top-bar hive, Wane (European style) hive, Langstroth (stacked) hive, etc. It should be appreciated that the beehives 102 as described herein are intended to be used such that honey produced from the bees living therein may be extracted therefrom. It should be further appreciated that, in some embodiments, the apiary 116, and more particularly the beehives 102 contained therein, may be intended to serve one or more additional and/or alternative purposes, such as the pollination of nearby crops, to provide safe-housing to mitigate the effects of colony collapse disorder, etc.

Each of the sensors 104 may be embodied as any combination of firmware, software, hardware, and/or circuitry capable of performing the functions described herein, including detecting a present condition and/or events/changes in the environment in which the sensors 104 are deployed. The illustrative sensors 104 include beehive sensors 106 and environment sensors 108. It should be appreciated that for the purposes of the description provided herein, the beehive sensors 106 include any type of sensor 104 usable to detect a state or condition of the beehive 102. In other words, beehive sensors 106 include any types of sensors 104 capable of measuring data (i.e., beehive data) related to a respective beehive 102 to which it is attached or in proximate location thereof. Examples of such beehive data may include a weight of the beehive 102, a temperature inside the beehive 102, an activity level inside the beehive 102, etc.

It should be further appreciated that for the purposes of the description provided herein, the environment sensors 108 include any type of sensor 104 usable to detect a state or condition of an environment condition the apiary 116. In other words, the environment sensors 108 include any types of sensors 104 usable for measuring data (i.e., environment data) of the apiary 116 in which the beehives 102 reside, or the immediately surrounding area of the apiary 116. Examples of such environment data may include weather conditions (e.g., temperature, wind, humidity, sunlight, shade, UV levels, etc.) of the apiary at a given point in time and/or over a particular window of time, a time of day (e.g., dawn, dusk, etc.), detected motion/activity (e.g., of beekeepers, bees, animals, etc.), etc.

In some embodiments, the system 100 may additionally include one or more actuators 110. The actuators 110 may be embodied as any combination of firmware, software, hardware, and/or circuitry capable of performing the functions described herein, such as moving or controlling a mechanism or component. As illustratively shown, one or more of the actuators 110 may be located proximate to one of the beehives 102. In other words, in some embodiments, one or more of the actuators 110 may be affixed to a mechanism or component internal to or otherwise attached or operatively coupled to one of the beehives 102. Additionally or alternatively, as also illustratively shown, one or more of the actuators 110 may be affixed to a mechanism or component located external to the beehives 102, in some embodiments. In an illustrative example, one of the actuators 110 may be configured to open a valve to release a variable amount of smoke from a smoker to which the respective actuator 110 has been affixed.

Figure 2:
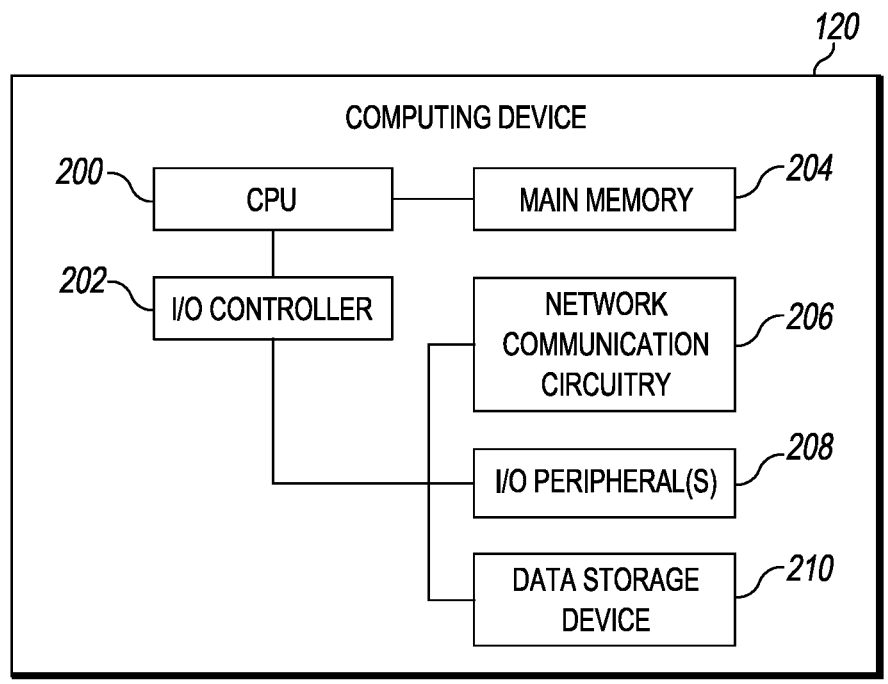
FIG. 2 is a block diagram of an illustrative embodiment of the computing devices of the system of FIG. 1.

The computing devices 120 may be embodied as any combination of firmware, software, hardware, and/or circuitry capable of performing the functions described herein. Referring now to FIG. 2, an embodiment of an illustrative computing device 120 is shown. The illustrative computing device 120 includes a CPU 200, an input/output (I/O) controller 202, a memory 204, a network communication circuitry 206, one or more I/O peripherals 208, and a data storage device 210. In some embodiments, one or more of the illustrative components may be combined on a single system-on-a-chip (SoC) on a single integrated circuit (IC). It should be appreciated that alternative embodiments may include additional, fewer, and/or alternative components to those of the illustrative computing device 120, such as may be found in a typical computing device (e.g., a graphics processing unit (GPU), a power supply, etc.). It should be further appreciated that the components and capabilities of each of the computing devices 120 may be based on the functionality of the respective computing devices as described herein.

The CPU 200 may be embodied as any type of hardware or combination of circuitry capable of processing data. Accordingly, the CPU 200 may include a single processing core (e.g., in a single-core processor architecture) or more than one processing core (e.g., in a multi-core processor architecture). Irrespective of the number of processing cores, the CPU 200 is capable of reading and executing program instructions. In some embodiments, the CPU 200 may include a cache memory (not shown). In such embodiments, the cache memory may be integrated directly with the CPU 200 or placed on a separate chip with a separate interconnect to the CPU 200. It should be appreciated that, in some embodiments, pipeline logic may be used to perform software and/or hardware operations (e.g., network traffic processing operations), rather than commands issued to/from the CPU 200.

The I/O controller 202, or I/O interface, may be embodied as any type of computer hardware or combination of circuitry capable of interfacing between input/output devices and the computing device 120. Illustratively, the I/O controller 202 is configured to receive input/output requests from the CPU 200, and send control signals to the respective input/output devices, thereby managing the data flow to/from the computing device 120.

The memory 204 may be embodied as any type of computer hardware or combination of circuitry capable of holding data and instructions for processing. Such memory 204 may be referred to as main or primary memory. It should be appreciated that, in some embodiments, one or more components may have direct access to memory, such that certain data may be stored via direct memory access (DMA) independently of the CPU 200.

The network communication circuitry 206 may be embodied as any type of computer hardware or combination of circuitry capable of managing network interfacing communications (e.g., messages, datagrams, packets, etc.) via wireless and/or wired communication modes. Accordingly, in some embodiments, the network communication circuitry 206 may include a network interface controller (NIC) capable of being configured to connect the computing device 120 to a computer network (e.g., the network 118).

The one or more I/O peripherals 208 may be embodied as any auxiliary device configured to connect to and communicate with the computing device 120. For example, the I/O peripherals 208 may include, but are not limited to, a touchpad, a keypad, a keyboard, a microphone, one or more buttons, a display (e.g., a liquid crystal diode (LED) display), a touchscreen, a speaker, one or more illuminating components (e.g., light emitting diode(s) (LEDs)), etc. Accordingly, it should be appreciated that some I/O peripherals 208 are capable of facilitating only input or output functions, while others are capable of performing both functions (i.e., input and output).

The data storage device 210 may be embodied as any type of computer hardware capable of the non-volatile storage of data (e.g., semiconductor storage media, magnetic storage media, optical storage media, etc.). Such data storage devices 210 are commonly referred to as auxiliary or secondary storage, and are typically used to store a large amount of data relative to the memory 204 described above.

Referring back to FIG. 1, the gateway computing device 112 may be embodied as any type of network gateway device capable of forwarding network traffic between networks (e.g., the wireless network 114 and the network 118). It should be appreciated that the type and functional capacity of the gateway computing device 112 may be dependent on the type of the wireless network 114 in which the gateway computing device 112 is used. The wireless network 114 may be embodied as any type of network architecture/topology capable of performing the functions described herein. For example, in some embodiments, the wireless network 114 may be configured as a star network, in which the gateway computing device 112 serves as a central hub (see, e.g., the illustrative wireless network 114 of FIG. 1). In other words, in the star network configuration, each of the sensors 104 are linked to the gateway computing device 112 only, not to one or more of the other sensors 104.

In an alternative embodiment, the wireless network 114 may be configured as a mesh network, such as a wireless sensor network, in which each of the sensors 104 include repeater/routing capabilities. Accordingly, in the mesh network configuration, unlike the star network configuration, each of the sensors 104 are connected to one or more of the other sensors 104 of the wireless network 114. As such, information from one of the sensors 104 can be relayed onto another of the one or more sensors 104 in an effort to transmit collected data to the gateway computing device 112.

The network 118 may be implemented as any type of wired and/or wireless network, such as a local area network (LAN), a wide area network (WAN), a global network (e.g., the Internet), etc. Accordingly, one or more network communication technologies (e.g., Ethernet, cellular, satellite, etc.) and associated protocols may be used. The network 118 may include one or more communicatively coupled network computing devices (not shown) for facilitating the flow and processing of network communication traffic via a series of interconnects. Such network computing devices may include, but are not limited to, one or more virtual and/or physical access points, routers, switches, servers, network hubs, compute devices, storage devices, etc.

It should be appreciated that one or more of such network computing devices may be configured to couple one or more of the computing devices 120 (e.g., the gateway computing device 112, the remote data analysis computing device 124, the client computing device 128, and the remote data provider computing device 132 of the system 100 of FIG. 1) to the network 118 as needed to facilitate network-based communications therebetween. To do so, the computing devices 120 may connect to the network 118 (e.g., via the network communication circuitry 206 of FIG. 2) using wired (e.g., Ethernet, token ring, etc.) and/or wireless (e.g., Bluetooth®, Wi-Fi®, wireless broadband, ZigBee®, etc.) communication technologies and associated protocols.

The remote data analysis device 124 may be embodied as any type of computing device 120 capable of monitoring, aggregating, and storing received data (e.g., data collected and transmitted by the sensors 104 of the apiary 116), as well as analyzing the data to determine whether an action should be taken as a result of the analysis. To do so, the illustrative remote data analysis device 124 includes or is otherwise communicatively coupled to an apiary data analysis engine 126 (see, e.g., the illustrative apiary data analysis engine 126 of FIG. 4). The apiary data analysis engine 126, which is described in further detail below, may be embodied as a web server program (e.g., in a client-server architecture) running on the remote data analysis device 124 (e.g., as a cloud-based service). The apiary data analysis engine 126 is additionally configured to communicate with the data monitoring application 130 of the client computing device 128 (e.g., in a client-server relationship via the network 118).

The remote data analysis device 124 may be embodied as any type of computing device with sufficient storage and compute capabilities to perform the functions described herein. It should be appreciated that while the remote data analysis device 124 is illustratively shown as a single computing device 120, the remote data analysis device 124 may include more than one computing device 120, in some embodiments, such as in distributed or parallel computing embodiments. For example, in some embodiments, the remote data analysis device 124 may be embodied as one or more servers (e.g., cloud servers, stand-alone, rack-mounted, etc.) and/or combination of compute blades and data storage devices (e.g., of a storage area network (SAN)).

It should be appreciated that the remote data analysis device 124 may be communicatively coupled to more than one apiary (e.g., via a respective gateway computing device 112 of each apiary to which the remote data analysis device 124 is communicatively coupled) at any given point in time. In other words, the remote data analysis device 124 may be configured to monitor, aggregate, store, and analyze the data corresponding to more than one apiary 116 at a time. Accordingly, in such embodiments, the remote data analysis device 124 may be configured to leverage data from one or more apiaries 116 to analyze another apiary 116.

The client computing device 128 may be embodied as any type of computing device 120 capable of displaying data received from the remote data analysis device 124, receiving input data from a user of the client computing device 128, and transmitting the received input data to the remote data analysis device 124. To do so, the illustrative client computing device 128 includes a data monitoring application 130 (see, e.g., the illustrative data monitoring application 130 of FIG. 3). The data monitoring application 130, which is described in further detail below, may be embodied as a user interfacing thin-client application, such as, but not limited to, a web browser, a web application, a mobile application, an application programming interface (API) infrastructure, or other Internet connected software application. It should be appreciated that the data monitoring application 130 is configured to run, or otherwise being executed on, the client computing device 128 and is additionally configured to communicate with the apiary data analysis engine 126 of the remote data analysis device 124 (e.g., in a client-server relationship via the network 118).

In some embodiments, the client computing device 128 may be embodied as a mobile computing device that uses mobile-specific hardware and software (e.g., an operating system) for operating, executing, and providing services and applications to support a mobile architecture and portability. Illustrative examples of such mobile computing devices may include, but are not limited to, smartphones, wearables (e.g., smartwatches, smart glasses, etc.), tablets, laptops, notebooks, etc. Alternatively, in other embodiments, the client computing device 128 may be a stationary computing device, such as a desktop computer, an all-in-one computer, etc. It should be appreciated that, in some embodiments, the system 100 may include more than one client computing device 128. In other words, more than one client computing device 128 may be communicatively coupled to the remote data analysis device 124 at a given point in time.

The remote data provider computing device 132 may be embodied as any type of computing device capable of performing the functions described herein, including, but not limited to, aggregating data into an organized database and transmitting the aggregated data, or a result of an analysis performed thereon, to the remote data analysis device 124. For example, the remote data provider computing device 132 may be configured to collect and/or aggregate weather related data and transmit present and projected future weather conditions. Accordingly, the remote data provider computing device 132 may be embodied as a server, a compute device, a storage device, or a combination thereof. It should be appreciated that, similar to the remote data analysis device 124, the remote data provider computing device 132 may include more than one computing device 120, in some embodiments, such as in distributed or parallel computing embodiments.

Figure 3:
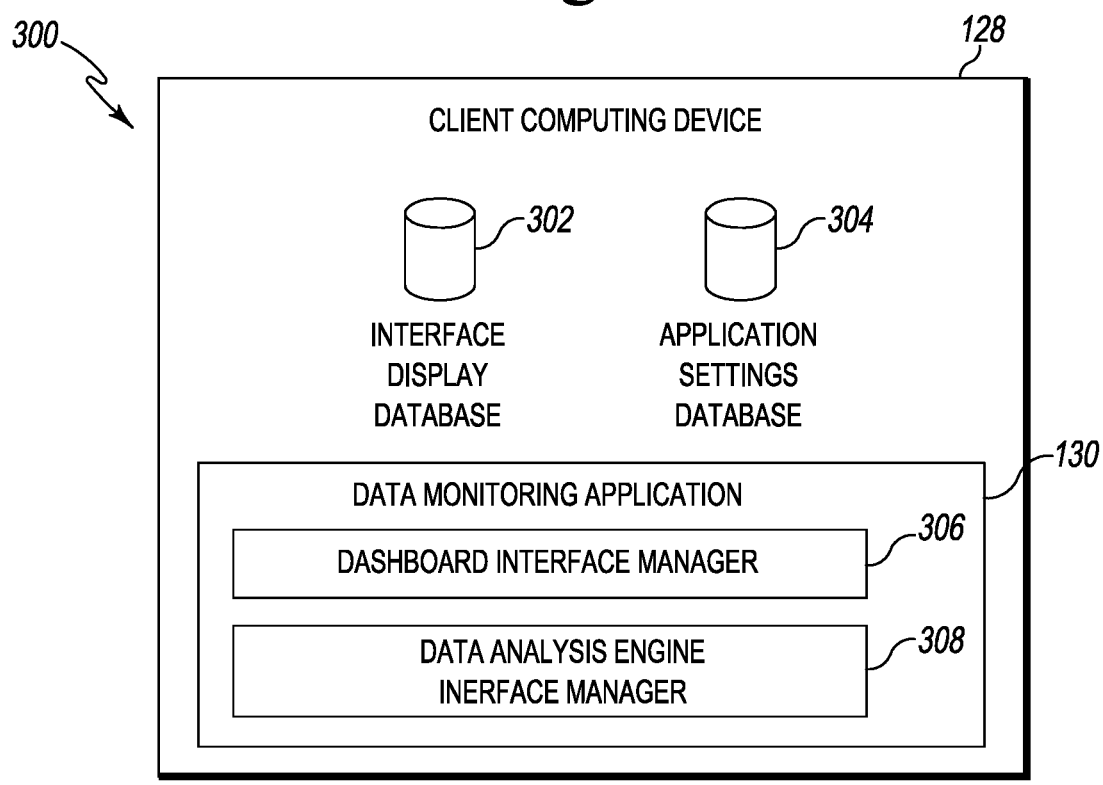
FIG. 3 is a block diagram of an illustrative embodiment of an environment of the client computing device of the system of FIG. 1.

Referring now to FIG. 3, in an illustrative embodiment, the client computing device 128 establishes an environment 300 during operation. The illustrative environment 300 includes an interface display database 302 and an application settings database 304, each of which may be stored in a memory and/or data storage device of the client computing device 128. It should be appreciated that, in some embodiments, the data stored in, or otherwise represented by, each of the interface display database 302 and the application settings database 304 may not be mutually exclusive relative to each other.

The interface display database 302 is configured to store interface display information received from the remote data analysis computing device 124. Such interface display information may be usable to display or render/display a user interface of the data monitoring application to a display of the client computing device 128. The application settings database 304 is configured to store settings information of the data monitoring application 130. The settings information may include any settings usable by the data monitoring application 130 to determine which data types are being monitored, define one or more thresholds, set a weight and/or priority level to certain types of data, and/or set one or more actions associated with the collected data and corresponding thresholds. For example, the settings may include user-definable thresholds and/or parameters that may be usable to dynamically adjust one or more thresholds.

The illustrative environment 300 additionally includes an illustrative embodiment of the data monitoring application 130. The illustrative data monitoring application 130 includes a dashboard interface manager 306 and a data analysis engine interface manager 308. It should be appreciated that the interfaces described herein for managing the user interactions (e.g., displaying the GUI and receiving user inputs) are graphical user interfaces (GUIs) which allow the user to interact with the application referred to herein through GUI elements, graphical images, and visual indicators. Accordingly, the dashboard interface manager 306 is configured to render/display a GUI of the data monitoring application 130 to a display of the client computing device 128 such as, for example, the user interfaces 600, 700 of FIGS. 6-8. In some embodiments, at least a portion of the user interface of the data monitoring application 130 may be viewed and/or accessed as a function of a level of permission(s) and/or needs of the user. For example, the dashboard interface manager 306 may be configured to display certain information (e.g., via dedicated interface modules) based on whether the user is a beekeeper, a farmer, a researcher, etc., such that the respective user type can access the information and adjust settings relevant to that particular user type.

In some embodiments, the dashboard interface manager 306 may be additionally configured to generate audible tones (i.e., initiate playback of a sound file), such as may be associated with a notification message, or some other indication of an event associated with the data monitoring application 130. The dashboard interface manager 306 is further configured to receive inputs (e.g., notes, comments, selections, etc.) from a user of the client computing device 128, such as may be received via a touchscreen display of the client computing device 128, or other peripheral device (e.g., stylus, mouse, keyboard, keypad, microphone, etc.) connected to the client computing device 128.

The data analysis engine interface manager 308 is configured to interface with the remote data analysis computing device 124. To do so, the data analysis engine interface manager 308 is configured to establish a communication channel with the remote data analysis computing device 124, which is usable to transmit and receive messages (e.g., network traffic, packets, messages, etc.) therebetween.

Accordingly, the data analysis engine interface manager 308 is configured to generate messages for transmission to the remote data analysis computing device 124, such as may be generated based on inputs received from a user by the dashboard interface manager 306. As such, the data analysis engine interface manager 308 can provide information (e.g., changed settings, dashboard display requests, initiated actions, etc.) that is usable by the remote data analysis computing device 124, and more particularly by the apiary data analysis engine 126, to update a setting associated with the data being monitored, adjust the analysis being performed, etc. Additionally, in some embodiments, the information may be usable by the remote data analysis computing device 124 to initiate an operation to be performed, or otherwise set a time/schedule for an operation to be performed, such as may be performed via one of the actuators 100 of the apiary 116. Additionally, in some embodiments, the occurrence of a condition (such as the actual or forecasted temperature drops below a threshold) may be usable by the remote data analysis computing device 124 to initiate an operation to be performed, or otherwise set a time/schedule for an operation to be performed, such as may be performed via one of the actuators 100 of the apiary 116. The data analysis engine interface manager 308 is additionally configured to process messages received from the remote data analysis computing device 124. For example, the data analysis engine interface manager 308 is configured interpret a message received from the remote data analysis computing device 124 to determine what information is to be displayed by the data monitoring application 130 to a display of the client computing device 128 (e.g., in a GUI dashboard of the data monitoring application 130) and/or other output device coupled to the client computing device 128. It should be appreciated that the received information may include data (e.g., in a payload of a network packet) that includes information related to an object that is usable to download and/or render one or more GUI elements, icons, graphics, text, etc., for output by the client computing device 128.

Figure 4:
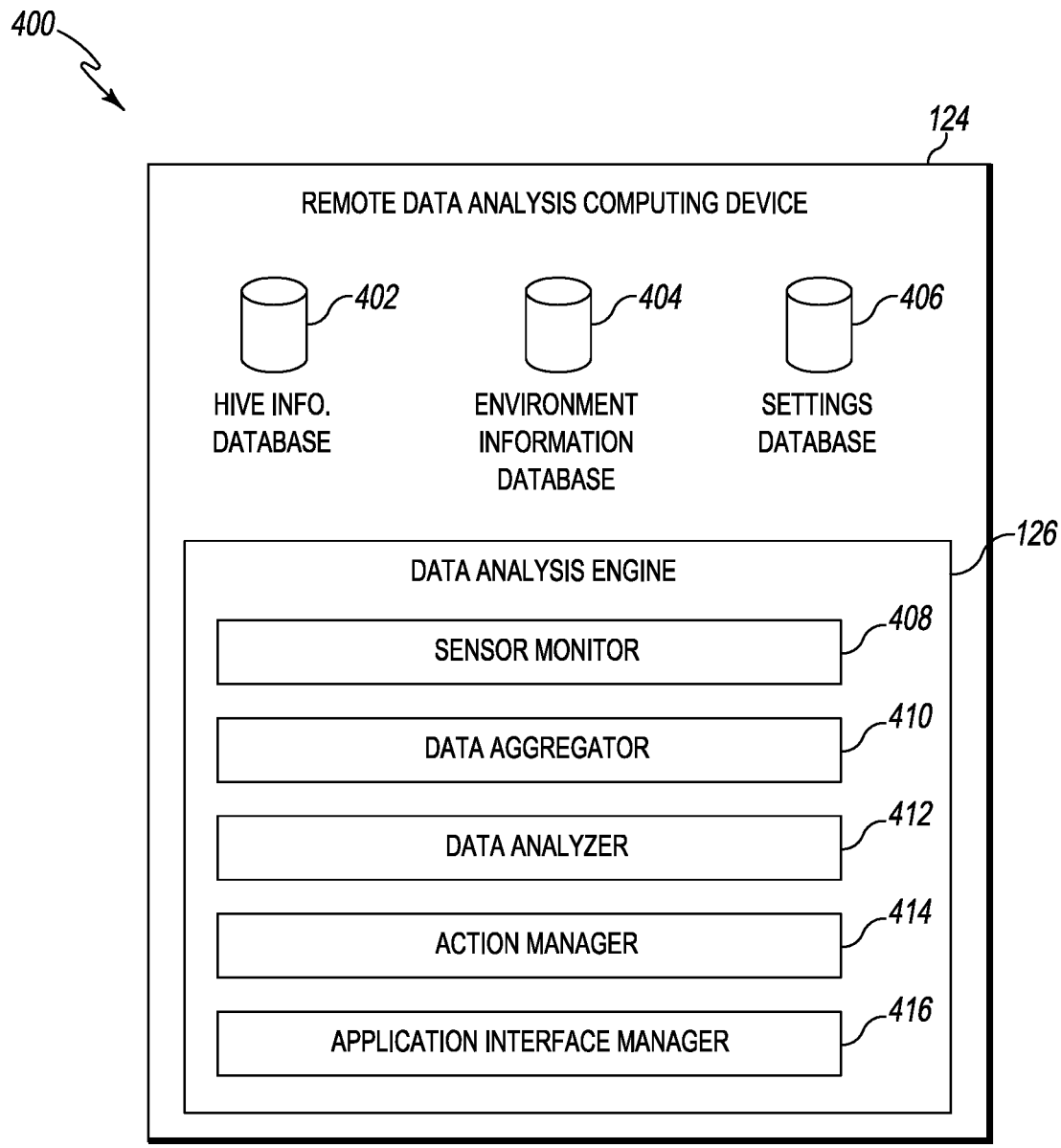
FIG. 4 is a block diagram of an illustrative embodiment of an environment of the remote data analysis computing device of the system of FIG. 1.

Referring now to FIG. 4, in an illustrative embodiment, the remote data analysis computing device 124 establishes an environment 400 during operation. The illustrative environment 400 includes a hive information database 402, an environment information database 404, and a settings database 406, each of which may be stored in a memory and/or data storage device of the remote data analysis computing device 124. The hive information database 402 may be configured to store beehive 102 related data (i.e., beehive data), such as may be captured by and received from the beehive sensors 106 of FIG. 1; whereas the environment information database 404 may be configured to store data related to the environment (i.e., environment data) of the apiary 116 in which the beehives 102 reside, such as may be captured by and received from the environment sensors 108 of FIG. 1.

It should be appreciated that, in some embodiments, the data stored in, or otherwise represented by, each of the hive information database 402, the environment information database 404, and the settings database 406 may not be mutually exclusive relative to each other. In some embodiments, one or more of the hive information database 402, the environment information database 404, and the settings database 406 may include data from beehives 102 of multiple apiaries 116. In such embodiments, the data from one apiary 116 may be siloed from and/or combined with the data from other apiaries 116.

The illustrative environment 400 additionally includes an illustrative embodiment of the apiary data analysis engine 126. The illustrative data analysis engine 126 includes a sensor monitor 408, a data aggregator 410, a data analyzer 412, an action manager 414, and an application interface manager 416. It should be appreciated that, in some embodiments, one or more of the components of the illustrative data analysis engine 126 may be combined to result in fewer components (e.g., the data analyzer 412 may perform the function of the sensor monitor 408 and/or the data aggregator 410). Additionally, it should be further appreciated that, in some embodiments, one or more of the components of the illustrative data analysis engine 126 may be divided into a subset of components.

The sensor monitor 408, which may be embodied as any type of firmware, hardware, software, circuitry, or combination thereof, is configured to receive the data collected by the sensors 104 and store the received sensor data in the appropriate fields of the respective database (e.g., the hive information database 402 and/or the environment information database 404). It should be appreciated that the types of beehive data collected from the beehive sensors 106 may be predicated on the types of beehive sensors 106 in use in a particular beehive 102. Similarly, it should be appreciated that the types of environment data collected from the environment sensors 108 may be predicated on the types of environment sensors 108 in use in a particular apiary 116.

As described previously, the beehive data may include any data related to at least a portion of a beehive 102, such as a weight of the beehive 102, a temperature inside the beehive 102, an activity level inside the beehive 102, pheromone levels, etc. As also described previously, the environment data of the apiary 116 may include weather conditions (e.g., temperature, wind, humidity, sunlight, shade, UV levels, etc.), a time of day (e.g., dawn, dusk, etc.), detected motion/activity, etc. Such data can be used to make decisions regarding and issue action instructions to adjust a physical characteristic of the beehive 102 such as to close doors, change louvre positions, rotate the beehive, and the like.

In an illustrative example, one or more of the bees may be individually monitored, or tracked, using a micro-sized transponders/transceivers (e.g., a micro NFC/RFID transponder, a Bluetooth® Low Energy (BLE) micro module, or some other type of low power wireless communication technology module) that may be used for wireless tracking and/or identification purposes. In such embodiments, the micro-sized transponder may be configured to interface with one or more sensors 104 and/or readers associated with the micro-sized transponder (e.g., an RFID reader) that may be placed within the apiary 116, or more particularly within or otherwise associated with a particular beehive 102. For example, in such embodiments, ingress/egress pattern data may be captured for analysis.

Additionally or alternatively, in some embodiments, one or more GPS tracking devices may be employed. For example, in such embodiments, the queen bee of a particular beehive 102 may have a GPS tracking device affixed thereto such that movement, flight speed, flight pattern, and other properties can be tracked and monitored. Accordingly, in such embodiments, the sensor monitor 408 may be configured to interface with or otherwise be configured to interpret the tracking information received from such tracking technologies for analysis.

The data aggregator 410, which may be embodied as any type of firmware, hardware, software, circuitry, or combination thereof, is configured to aggregate, refine, and enhance the received data. To do so, the data aggregator 410 may be configured to gather data from a number of data sources other than the sensors 104. In other words, while the majority of the data described as being collected herein has been described in relation to the data received from the sensors 104, it should be appreciated that additional and/or alternative data elements may be received from a source other than the sensors 104, such that the externally received data may be usable to refine and/or enhance the sensor 104 received data.

For example, in some embodiments, the data aggregator 410 may be further configured to aggregate data received from a user (i.e., by way of the data monitoring application 130), such as may be received via the application interface manager 416, as well as any externally received and/or user input data. Accordingly, it should be appreciated that the hive information database 402 and/or environment information database 404 may include additional information that was not collected by the sensors 104, such as may have been acquired, gathered, or input by another source (e.g., a user of the data monitoring application 130 of the client computing device 128) or received from an external source (e.g., via an API of a data aggregator).

In an illustrative example, a user (e.g., a beekeeper, an apiary owner, an administrator, etc.) may input information (e.g., via the data monitoring application 130) usable by the data analysis engine 126 to refine and/or enhance the data of the hive information database 402 and/or environment information database 404 (i.e., the data that has been received from the beehive sensors 106 and/or the environment sensors 108). The user input data may include data related the bees in the apiary 116 or a particular one or more of the beehives 102.

For example, the user input data may include genetic information, breeding information, traits, wing span and thickness, coloration, etc. In another example, the user input data may be related to a particular hive, such as egg-laying levels, propolis levels, weight/size of individual bees in population (e.g., population size, number of drones, proportion of new/winter bees, proportion of workers to drones, etc.), honey production levels, parasite/pest types/levels (e.g., Varroa mites, small hive beetles, wax moths, etc.), travel routes/speed of the queen and/or other bee types, etc. In still another example, the user input data may be related to the feeding of the bees in the apiary 116 or a particular one or more of the beehives 102, such as a time of day of the feeding, a type/amount of food distributed, a type/amount of vitamin supplements added to the food, etc.

The user input data may additionally include data related a beekeeper prior to, during, or subsequent to interaction(s) with one or more beehives 102 of the apiary 116. Accordingly, it should be appreciated that such information may be input prior to, during, or subsequent to interaction(s), depending on the type of input. For example, the interaction data may include dietary information of the beekeeper, a mood of the beekeeper, a present health condition of the beekeeper, etc., prior to an interaction. Additionally and/or alternatively, the interaction data may include a duration of the interaction (e.g., with a particular beehive 102, in the apiary 116, etc.), a description of beekeeping attire worn (e.g., veils/masks, clothing, etc.), type of equipment used (e.g., smoker brand, size, fuel type, etc.) a mood of the beekeeper, noise(s) made, whether the beekeeper was stung (e.g., at a particular beehive 102, in the apiary 116, etc.), etc., during an interaction.

In another illustrative example, the data aggregator 410 may be configured to interface with an externally managed data source (e.g., an external data aggregator) to refine and/or enhance the data of the hive information database 402 and/or environment information database 404. Such externally acquired data may include weather prediction data (e.g., from a weather data aggregator), animal/insect migration patterns, air quality levels, etc. Additionally, the data aggregator 410 may be configured to collect external environmental data of one or more areas neighboring the apiary 116. Such neighboring environmental data may include, but is not limited to, a number and/or types of plants (e.g., food sources, trees, medicinal plants, etc.), other pollinators/apiaries, a number and/or types of animals/insects/humans, land type/usage, pesticide usage, water pollution levels, etc. It should be further appreciated that some input data may be discernable from other input data via an externally managed data source. For example, an address of the apiary 116 may be usable to determine an elevation, latitude and longitude, etc., of the apiary 116. GPS or other geo-location information and data, altitude, and orientation and other positioning information such as measured through accelerometers and other devices known to those of ordinary skill in the art.

While the data described herein is described as being collected from a particular source (e.g., beehive sensors 106, environment sensors 108, user input, $3^{rd}$ party data aggregators, etc.), it should be appreciated that the data may be collected from an alternative data source, which may or may not be described herein. For example, in some embodiments, at least a portion of the data described herein as being collected via user input may be collected by one or more sensors 104 in other embodiments.

The data analyzer 412, which may be embodied as any type of firmware, hardware, software, circuitry, or combination thereof, is configured to analyze the received data, as well as the aggregated data (e.g., including user input data), such that correlations may be determined therefrom which are usable to identify one or more actions that may be taken as a function of the correlations and present condition information. To do so, the data analyzer 412 may be configured to use one or more machine learning algorithms, regression analysis methods, and/or the like to perform the analysis. The data analyzer 412 may be further configured to transmit the results of the analysis to the action manager 414 and/or the application interface manager 416, each of which are described in further detail below.

For example, the data analyzer 412 may be configured to compare at least a portion of a result of the analysis to a threshold (e.g., a statistics threshold) to determine whether the result violates (e.g., exceeds, is less than, is outside of a range, etc.) the threshold or that the results of the analysis otherwise indicate that an action should be taken (e.g., based on historical data). In some embodiments, one or more of the thresholds may be statically defined by a user (e.g., via the data monitoring application 130), the settings of which may be stored in the settings database 406. However, the data analyzer 412 may be configured to determine or otherwise adjust one or more other thresholds in a dynamic fashion, as may be determined based on previously performed analyses and the results related thereto.

Other data either measured or observed may include age of the hive, length of beehive deployment, number of moves of the hive, other movement of the beehive, beehive mechanical structure information. Further, information can be gathered and calculations and other functions performed regarding crop yield and yield changes over time, and data regarding hive density, placement and any relationship with crop yield, calculations can be made and recommendations or instructions communicated regarding adjustment of physical characteristics of the beehives and/or the apiary such as replacement of particular beehives, adding new beehives, removal of beehives, repositioning of beehives, and the like.

In another example, the data analyzer 412 may be configured to perform an image analysis on digital images captured (e.g., color, black and white, infrared, etc.) by one of the sensors 104. In an illustrative example, the data analysis engine 126 may be configured to analyze an image to determine an actual or estimated number of objects (e.g., eggs, types of bees, pollen, etc.) inside a particular beehive 102 based on one or more digital images received from a beehive sensor 106 embodied as an image sensor. It should be appreciated that the data analyzer 412 is configured to collect multiple data points for performing the analysis and/or updating a confidence level associated with a result of a particular analysis. In an illustrative example, the data analyzer 412 may be configured to analyze the movement of a queen bee such that liveness can be monitored. In such embodiments in which the data analyzer 412 determines the queen has not move for a particular duration of time such that it may be inferred that the queen bee's health has been compromised, the data analyzer 412 may be configured to analyze received digital images to validate a lack of movement, such as may be attributable to illness or death, rather than the transponder having fallen off the queen.

The action manager 414, which may be embodied as any type of firmware, hardware, software, circuitry, or combination thereof, is configured to determine which action is to be commenced or otherwise performed by the apiary data analysis engine 126, such as may be initiated upon a result of the analysis performed by the data analyzer 412 resulting in a determination that one or more thresholds have been violated. Such actions may include transmitting a message to a corresponding data monitoring application 130 and/or a user (e.g., via an email, text message, etc.), transmitting a command to one or more actuators 110 of the respective apiary 116, adjusting a time associated with a resource of the respective apiary 116 (e.g., an automated feeder schedule), adding a corresponding entry into a calendar (e.g., Google Calendar™, Outlook®, Thunderbird®, etc.) linked to the corresponding data monitoring application 130, etc. It should be appreciated that the action manager 414 may be configured to make the determination of which action to perform based on one or more settings corresponding to a user account associated with the apiary 116 being monitored. In some embodiments, the action settings and/or user account settings may be stored in the settings database 406.

The application interface manager 416, which may be embodied as any type of firmware, hardware, software, circuitry, or combination thereof, is configured to interface with the corresponding data monitoring applications 130. To do so, the application interface manager 416 is configured to establish a communication channel with the data analysis engine interface manager 308, which is usable to transmit and receive messages (e.g., network traffic, packets, messages, etc.) therebetween.

Additionally, the application interface manager 416 is configured to authenticate a user of the data monitoring application 130. To do so, the application interface manager 416 is configured to receive credentials from the user of the data monitoring application 130 and verify whether the user is an authorized user, such as may be performed based on a comparison between the received credentials and valid credentials of the user, which may be stored in the settings database 406. Further, the application interface manager 416 is configured to manage the access to data and/or the controls which are associated with the authenticated account.

In an illustrative example of the apiary data analysis engine 126 in use, a sensor 106 of a beehive 102 may be a weight sensor that is configured to detect a weight of at least a portion of the beehive 102. In such an embodiment, the weight sensor may transmit a weight value that is received by the sensor monitor 408, aggregated with historically received weight values, and aggregated by the data analyzer 412. The result of the analysis by the data analyzer 412 may result in a determination that the received weight value is greater than a weight threshold value, or is otherwise consistent with a weight threshold value that is indicative of a favorable time to extract honey from that beehive 102. Alternatively or additionally, weight loss for a sufficient period of time may indicate a deteriorating beehive health, which may result in a determination that the beehive needs to be checked by a beekeeper, or swapped with another beehive, moved, or some other action taken to improve the result.

Accordingly, as a function of the determination that the received weight value is greater than a weight threshold value and depending on the settings associated with an account corresponding to that beehive 102, the action manager 414 may be configured to perform one or more actions. Additionally, also dependent on the settings associated with an account corresponding to that beehive 102, the application interface manager may be configured to generate one or more messages for transmission to the respective data monitoring application that is usable to display one or more of a visual representation of the monitored data, the aggregated data, a result of the analysis of the monitored data and the aggregated data, and the action(s) to be taken, if applicable.

Figure 5:
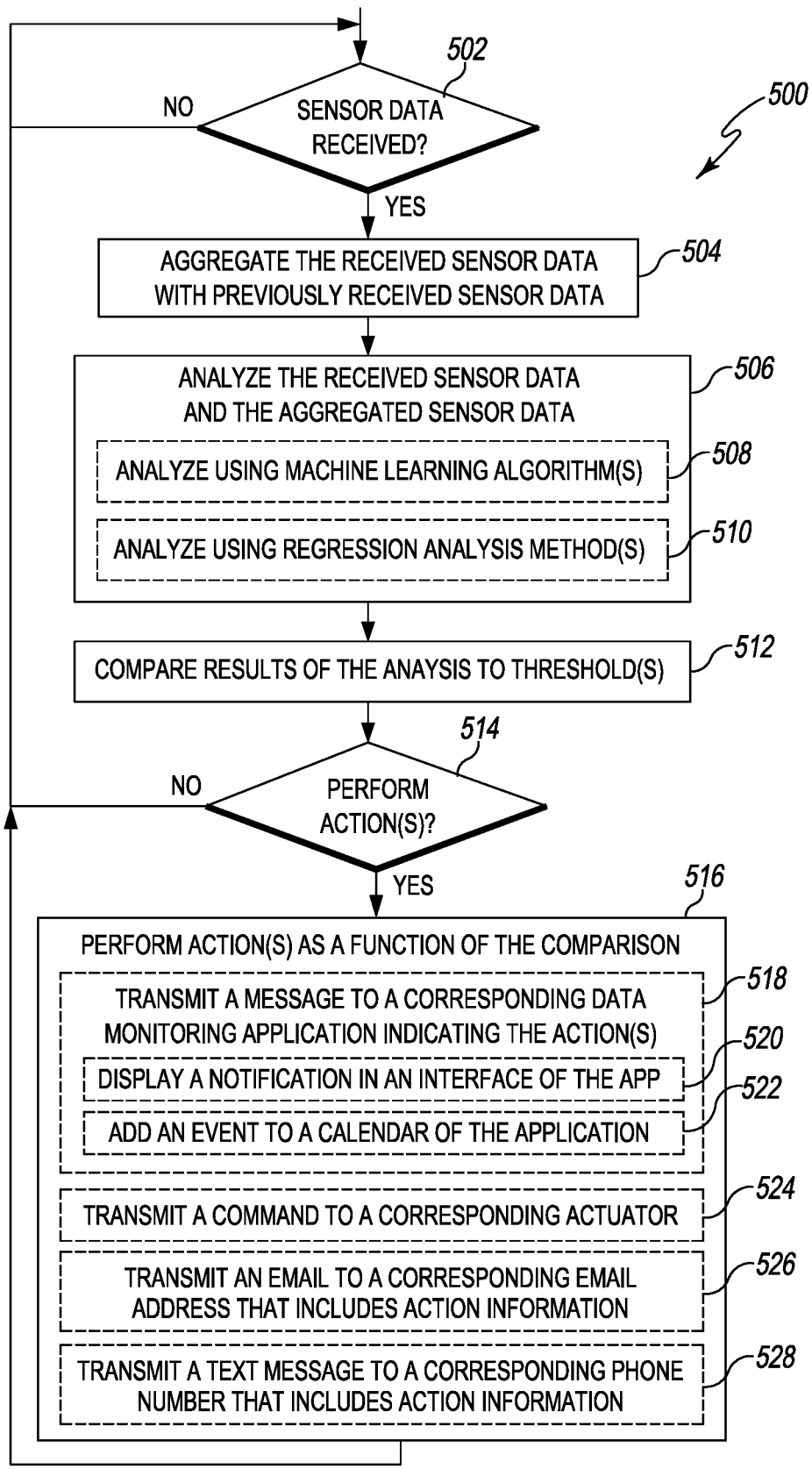
FIG. 5 is a schematic flow diagram of a method for monitoring and analyzing data of beehives in the apiary of the system of FIG. 1.

Referring now to FIG. 5, an illustrative method 500 is provided for monitoring and analyzing data of beehives (e.g., the beehives 102 of FIG. 1) in an apiary (e.g., the apiary 116 of FIG. 1) that may be performed by a remote data analysis computing device (e.g., the remote data analysis computing device 124 of FIG. 1), or more particularly by an apiary data analysis engine (e.g., the apiary data analysis engine 126 of FIG. 1) of the remote data analysis computing device. The method 500 begins in block 502, in which the apiary data analysis engine 126 determines whether sensor data has been received from one or more of the sensors 104 of the apiary 116 being monitored. As described previously, such data may correspond to a condition of a particular beehive 102, as may be received from one of the beehive sensors 106, or a condition of the apiary 116, as may be received from one of the environment sensors 108.

In block 504, the apiary data analysis engine 126 aggregates the received sensor data with previously received sensor data. In block 506, the apiary data analysis engine 126 analyzes the received sensor data and the aggregated sensor data (e.g., using statistical models). To do so, in some embodiments, in block 508, the apiary data analysis engine 126 is configured to analyze the data using one or more machine learning algorithms. Additionally or alternatively, in some embodiments, in block 510, the apiary data analysis engine 126 is configured to analyze the data using one or more regression analysis methods.

In block 512, the apiary data analysis engine 126 compares the results of the analysis to one or more thresholds. As described previously, the thresholds may be statically defined by a user (e.g., via the data monitoring application 130) or dynamically adjusted based on historical data (e.g., as may be determined based historical analysis performed and results related thereto). In block 514, the apiary data analysis engine 126 determines whether any thresholds have been violated or whether the results are otherwise indicative that an action should be taken. If the apiary data analysis engine 126 determines that an action should be taken in block 514, the method 500 advances to block 516.

In block 516, the apiary data analysis engine 126 performs one or more actions as a function of the comparison based on one or more settings of the apiary data analysis engine 126, as may be set by a user of a corresponding account via the data monitoring application 130. In some embodiments, in block 518, the apiary data analysis engine 126 may generate and transmit a message to the corresponding data monitoring application 130 (e.g., one or more instances of the data monitoring application 130 corresponding to the applicable account associated with the sensor data received in block 502. For example, in some embodiments, in block 520, the apiary data analysis engine 126 may be configured to display a notification in an interface of the data monitoring application 130. In another example, in some embodiments, in block 522, the apiary data analysis engine 126 may be configured to add an event to a calendar of the data monitoring application 130. It should be appreciated that, in some embodiments, the apiary data analysis engine 126 may be configured to add the calendar event to an external calendar application (e.g., Google Calendar™, Outlook®, Thunderbird®, etc.).

In some embodiments, in block 524, the apiary data analysis engine 126 may additionally or alternatively generate and transmit a command to a corresponding actuator (e.g., one of the actuators 110 of FIG. 1) that is usable by the receiving actuator to perform a particular operation (e.g., adjust a position of a mechanism attached to the actuator). Additionally or alternatively, in some embodiments, in block 526, the apiary data analysis engine 126 may generate and transmit an email to a corresponding email address of the user's account that includes information related to the action to be performed. It should be appreciated that, in some embodiments, the apiary data analysis engine 126 may be configured to provide a notification (e.g., via email, text, etc.) that indicates a state of the apiary 116, a beehive 102, and/or a particular one of the bees (e.g., the queen). In other embodiments, in block 528, the apiary data analysis engine 126 may additionally or alternatively generate and transmit a text message that includes information related to the action to be performed to a corresponding phone number of the user's account.

It should be appreciated that, in some embodiments, sensor data received from one or more other accounts, apiaries 116, beehives 102, etc., may be used to trigger an action. For example, a present state of a monitored beehive 102 (i.e., as determined based on the most recently received sensor data associated with that beehive 102) may indicate that an optimal time to extract honey from the monitored beehive 102 may be in two days; however, data of a similar beehive 102 in another apiary 116 associated with another user's account may indicate that now is an optimal time to extract the honey from the monitored beehive 102, such as may be based on weather patterns that affected the similar beehive 102 previously or are presently affecting the similar beehive 102 and are anticipated (e.g., based on the analysis performed in block 506) to have a similar effect on the monitored beehive 102.

It should be further appreciated that some information to be displayed (e.g., monitored sensor data, results of data analysis, etc.) and/or certain actions to be performed which are described herein may be queued for a particular user or account to which the actions correspond until a future point in time. For example, if that particular user or account associated therewith is not presently logged into the data monitoring application 130, such information may be queued until that user logs into the data monitoring application 130.

Example data and/or types of measurements received by the remote data analysis computing device 124, and outcomes for the beehive(s) 102 and/or the user (e.g., the beekeeper) associated with the data and/or types of measurements are listed below in Table 1

TABLE 1

| Data/Type of Measurement | Outcome for Hive | Outcome for User (e.g., Beekeeper) |
|---|---|---|
| From the beekeeper: | | |
| Standard veils/masks to unify friendly faces | Bees are calmer/less aggressive/less stressed | 1. Less smoke needed<br>2. Increased beekeeper productivity (beekeeper doesn't have to leave the area)<br>3. Can plan which hives to avoid/do last |
| | Less volatile hive | Beekeeper doesn't have to worry about the hive |
| Beekeeper clothing | 1. Bees less stressed<br>2. Less bees caught = less dying bees | 1. Less smoke needed<br>2. Increased beekeeper productivity (beekeeper doesn't have to leave the area)<br>3. Beekeeper doesn't have to worry about the hive<br>4. Can plan which hives to do last/avoid |
| Food eaten | 1. Bad reaction (stinging or aggression)<br>2. Increased calmness | 1. Less smoke needed<br>2. Increased beekeeper productivity (beekeeper doesn't have to leave the area)<br>3. Beekeeper doesn't have to worry about the hive |

TABLE 1-continued

| Data/Type of Measurement | Outcome for Hive | Outcome for User (e.g., Beekeeper) |
|---|---|---|
| Chemicals interacted with | Harm bees with toxicity | 1. Lose a hive<br>2. Loose hives around it<br>3. Infected equipment<br>4. Tainted honey and liability<br>5. Tainted comb<br>6. Increased cost<br>7. Loss of productivity (honey and laying) |
| | 1. Interferes with pheromones<br>   a. Mood change<br>   b. Ability to communicate | Difficulty to gauge hive health and mood |
| | Ability to sense threat | Loss of a colony |
| Human pheromones | Alters mood of hive | 1. Hard to gauge health<br>2. Hard to gauge normal moods<br>3. More smoke needed<br>4. Effects beekeeper productivity |
| | Sends message to hive | 1. Could optimize pheromones for certain behavior in the hives<br>2. Hive becomes conditioned to beekeeper, making it easier over time |
| Human noises (sneezes, cough, speech) | Affects aggression (warning sign to bees) | 1. Less smoke needed<br>2. Increased beekeeper productivity (beekeeper doesn't have to leave the area)<br>3. Helps plan which hives to avoid/do last |
| | Trained to expect them | 1. Easier to interact<br>2. More predictable |
| Mood of Beekeeper | Changes productivity | 1. Less honey, less brood rearing<br>2. More attention needed |
| | Bees match the mood | 1. Less smoke needed<br>2. Increased beekeeper productivity (beekeeper doesn't have to leave the area)<br>3. Helps plan which hives to avoid/do last<br>4. Chance the beekeeper might overlook something |
| Beekeeper Illness | Bees match the mood | 1. Less smoke needed<br>2. Increased beekeeper productivity (beekeeper doesn't have to leave the area)<br>3. Helps plan which hives to avoid/do last<br>4. Might overlook things in the hive |
| | Illness transmitted to hive, might alter pheromones, hive might struggle, might lose productivity and numbers | Lose hive |
| Environmental: | | |
| Aerial infrared and ultraviolet | Plants in the area | 1. Increased odds of honey<br>2. Site selection<br>3. Know about food and feeding year round |
| | Water sources | Site selection |
| | Indicates food source as strong or weak | 1. Site selection<br>2. When to feed<br>3. How many hives can be placed in the area |
| Medicinal plants available in area | Stronger defense and ability to combat against threats (including parasites and disease) | 1. Lower hive loss<br>2. Increase chance of survival<br>3. More success with other issues in the hive<br>4. Less hive checks needed<br>5. Saves money and time<br>6. Effects other hives |

TABLE 1-continued

| Data/Type of Measurement | Outcome for Hive | Outcome for User (e.g., Beekeeper) |
|---|---|---|
| Variety of food sources in the area (pollen and nectar sources) | 1. Health and strength of hive<br>2. Vitamins that bees need | 1. Taste of honey<br>2. Color of honey<br>3. Profitability of honey<br>4. Times when food availability is scarce and when type of feeding is needed (carbs or protein)<br>5. Peak times for extraction |
| Other pollinators in the area | 1. More competition<br>2. Less hive and pollination productivity | 1. Indicates good places to place bees<br>2. Less chance of pollination contracts<br>3. More resources used to keep hive alive<br>4. Might mean less pesticides |
| | Increased disease transmission = loss of production | 1. Less honey revenue<br>2. Might affect all hives |
| | Increased robbing | 1. Less honey<br>2. Time spent (installing excluder, checking hive, feeding |
| Trees in the area | More shade<br>Cuts down on wind (Helps regulate temperature) | 1. More accurate readings<br>2. Increased success of hive and productivity |
| | Availability of food for honey, potentially year round | 1. Less $ spent on sugar<br>2. Less time feeding<br>3. More honey (more visits to collect this)<br>4. More valuable honey<br>5. More money |
| Forest density | More potential food sources | 1. Less $ spent on sugar<br>2. Less time feeding<br>3. More honey (more visits to collect this)<br>4. More valuable honey<br>5. More money |
| | Easier to access food sources | 1. Collect more honey<br>2. More money |
| Beekeeper hives nearby | How fast food sources deplete | 1. Less honey<br>2. Interact with more beekeepers<br>    a. Political issues<br>    b. Increased robbing<br>3. Larger supply of honey = more buyer power |
| | Disease transmission | 1. More treatments<br>2. More visits<br>3. Dependence on medication<br>4. Cross infection to other hives<br>5. Decreases survival |
| | More robbing | 1. Less robbing<br>2. Time installing reducer<br>3. More time feeding |
| More of your hives in one place | Less food | 1. More time maintaining area<br>2. Putting all of your eggs in one basket<br>3. Less time needed going from site to site. |
| Presence of other animals (predators seeking honey and feeding on bees) | Increase defense numbers of guard bees, meaning less bees for foraging and brood rearing | 1. Wasps might cause the beekeeper to be stressed<br>2. Hive at risk<br>3. Make feeding difficult |
| Human density (rural) | 1. More pesticides<br>2. Less diversity of food sources (at least in Indiana)<br>3. More diversity? | 1. More time travelling to sites<br>2. Harder to get to<br>3. Need diagnosis (time)<br>4. Immune system = hive at risk = treat more<br>5. Tainted honey |
| Human density (suburban) | 1. Chemicals flows lawns<br>2. More diversity? Less diversity?<br>3. Air pollution, noise, might affect hive health | 1. Easier to get around<br>2. Traffic<br>3. Deal with upset neighbors<br>4. Robbing |

TABLE 1-continued

| Data/Type of Measurement | Outcome for Hive | Outcome for User (e.g., Beekeeper) |
|---|---|---|
| Human density (urban) | 1. More pollution<br>2. Less colonies in area, decrease chance of disease transmission<br>3. More competing pollinators<br>4. Non natural food sources, might affect health | 1. Less resources used to replace hive, hive better off<br>2. Less honey, low quality honey<br>3. Need to feed more<br>4. Affects honey |
| Elevation | 1. Ability for the queen to mate<br>2. Increased presence of wind<br>3. Decreased oxygen supply<br>4. Might affect performance, they might sense storm differently | 1. Hive dies, need to get a queen<br>2. Easier for new queen to mate<br>3. More tiring, more rest needed<br>4. More gas needed |
| Air pressure | 1. Predict and observe weather patterns and hive productivity<br>2. Sensing threats | 1. Predict when storms are coming<br>2. More $ and time<br>3. (sensing threats repeat here) |
| Latitude/longitude | 1. Climate<br>2. Bees have to adapt to climate patterns<br>3. Native and nonnative food sources<br>4. Magnetic field, need to point them in a direction | 1. Specific recommendations<br>2. Regions of beekeeping<br>3. Might impede on the need to move bees around<br>4. Lower pollination fees<br>5. Hurts reputation<br>6. (see food source)<br>7. Limits apiary design<br>8. Might not be feasible<br>9. Slope might be in the wrong direction, might limit where bees are placed |
| Drone (flying) | | What farms are nearby |
| Food availability | 1. More health, more honey<br>2. Might increase competition<br>3. Difficulty for bees to prioritize<br>4. Might miss a bloom<br>5. Do they go farther for better food (food sources could be rated on variety of factors or historical data observed or accessed)<br>6. More foragers dying<br>7. Less efficient, less honey produced in one day<br>8. Less pollen brought in | 1. Drives feeding schedule<br>2. Less time<br>3. More money<br>4. Detract from honey<br>5. Shorter season, less hive checks, more weather reliant<br>6. Don't get honey they want<br>7. Affect pollination contract<br>8. Might need to move bees for ore nutrition<br>9. Smaller honey crop, might not harvest honey<br>10. Move hives for next year closer to source<br>11. Might indicate better genes |
| Animal migration | 1. Monarchs<br>2. Increased competition for food sources<br>3. Birds<br>4. Different competition each year | Might indicate a good location with diversity |

Chemical Interference

| Data/Type of Measurement | Outcome for Hive | Outcome for User (e.g., Beekeeper) |
|---|---|---|
| Pesticide use in surrounding area | 1. Death from toxicity<br>2. Effect on the immune system (physio and psychological)<br>3. Might make food sources more or less attractive<br>4. Decreased competition<br>5. Application might affect bees differently<br>6. Used on one crop might affect other food sources in area on different plants | 1. Might make beekeeper threat<br>2. Site selection to try to avoid them, would want land owners not spraying<br>3. Adjust supply, add more hives |
| Mosquito spray periods | death | 1. needs to be notified when sprays happen<br>2. might need to make connection with the local people in the area |
| Air quality | 1. lifespan of bees<br>2. difficulty to fly<br>3. difficulty to breath<br>4. more grooming needed<br>5. more dangerous UV rays | 1. quality of honey<br>2. more rest periods needed<br>3. more dangerous uv rays |

TABLE 1-continued

| Data/Type of Measurement | Outcome for Hive | Outcome for User (e.g., Beekeeper) |
|---|---|---|
| Water pollution in area | 1. do they notice and avoid or continue to consume<br>2. toxicity affects<br>3. might not be a water alternative<br>4. difference between salt and fresh water<br>5. treatment for human consumption<br>6. chlorinated water<br>7. puddles and chemicals on road<br>8. storm water runoff<br>9. flowing vs stagnant sources | 1. treatment and lost hive<br>2. beekeeper needs to provide water source<br>3. a consideration in hive placement |
| Climate/Weather factors | | |
| Historical climate data | Historically warm periods and the hive's ability to prepare for winter | 1. Predict actions needed in hives<br>2. Drive hive placement<br>3. Overwintering methods |
| Fog | 1. Ability of bees to forage<br>2. Difficulty defending hive if not able to fly<br>3. Hinder food source, as they might not be able to bring it inside | 1. Difficult to drive<br>2. Might not be able to get to the bees<br>3. Honey production |
| Wind strength (holders could be used to keep hive flush) | 1. How far they will forage<br>2. Whether they forage at all<br>3. Controlling temp within the hive<br>4. Temp might be different in different parts of the hive<br>5. Is the priority to heat the hive or get food, if so would one harm the other<br>6. Loss of pollen and food sources<br>7. Pesticide drift | Honey production |
| Wind direction | 1. Direction the bees are pushed towards<br>2. Might bring in different warm or cold air or different pressure<br>3. Type of wind | Hive placement consideration |
| Cloud cover | 1. Ability to forage and bring in honey<br>2. Compare cloud cover in similar climates<br>3. Affects their ability to see plants<br>4. Not as much food available from less sunlight<br>5. Slower to get moving in the morning<br>6. How much does this affect things?<br>7. Increase fungus | 1. Money<br>2. Pollination contract issues<br>3. Harder to visit hives<br>   a. Meaner, more time<br>4. Cooler, more comfortable<br>5. Move hives<br>6. Hive at risk<br>7. treat |
| Temperature | 1. affect hive foraging, honey<br>2. cant be productive<br>3. have to cool hive, detracts from other productivity<br>4. propolis levels, wax sagging, honey running<br>5. moisture content within honey<br>6. increases mite and other pest activity | 1. When to open hives<br>2. Knowledge about the hive<br>3. Changes when it is too hot<br>4. If bearding and smoke if that hurts hive<br>5. Money<br>6. Lose hive<br>7. Affects when the beekeeper is available<br>8. Sweat affecting the hive<br>9. Smell of a smelly beekeeper<br>10. Hot propolis -> easier<br>11. Cold -> harder<br>12. treat |

TABLE 1-continued

| Data/Type of Measurement | Outcome for Hive | Outcome for User (e.g., Beekeeper) |
|---|---|---|
| Shade/sunlight levels | 1. Ability for control fungus<br>2. Changes productivity<br>3. More wax moths<br>4. Don't wake up during the day right away to get moving<br>5. Slower changes in productivity<br>    a. Less time for honey<br>6. Ability to maintain temperature levels<br>    a. Increases swarming<br>7. Overheat more in the sun<br>    a. Cooling hive<br>8. Shade: ability to stay warm<br>    a. Does the lack of leaves make it easier for sun<br>9. Propolis seals faster<br>    a. Is it harder for bees to use propolis<br>10. Trees nearby<br>    a. Drops branches, pesticides, dust, etc<br>    b. Animals nearby<br>11. More humid in shade | 1. Where a beekeeper places a hive<br>2. Losing a hive<br>3. When they do activities<br>4. New foundation<br>    a. Lose productivity<br>5. Lose some honey crop<br>6. Maintenance time cleaning and treating,<br>7. Time of day to visit bees<br>    a. Perspective of hives might be affected<br>8. Money<br>9. Harder to get in the hives<br>10. Less time maintaining area nearby<br>11. Less time painting and maintaining hives<br>12. Lose a hive |
| Drought | 1. Water availability<br>2. Plants blooming, producing nectar and pollen<br>    a. Honey yield<br>3. More dust more chances of pesticide drive<br>4. More time | 1. Beekeeper has to set our water<br>2. Money<br>3. Feed more<br>4. Losing hive |
| UV level | 1. Increase visibility of flowers and food sources<br>    a. honey<br>2. Sunburnt<br>3. Affects ability to see<br>4. More pollen?<br>5. Weaker<br>    a. More burden on grooming and nurse bees | 1. Sunburnt, risks cancer<br>    a. Affects mood<br>2. Money<br>3. Lose hive<br>4. Vision in hive |
| Storms | 1. Ability to collect honey (weight)<br>2. Vibration changes in the hive<br>3. Pheromone changes inside the hive<br>4. Pollen can get washed away and entire flow gone<br>5. Changes behavior/prepare hive<br>6. Affects strength<br>7. Are some storms more stressful than others?<br>    a. Longer storms<br>    b. Quick temperature drops<br>8. Natural disasters might be devastating<br>    a. Lightening effects<br>9. Do they change jobs when they can't forage<br>10. Does it get overcrowded<br>11. After a storm, do they pick back up? (if the storm happened in the middle of the day<br>12. Electrical currents in air effects their communication<br>13. Is there a connection with the earth's magnetic field | 1. Honey production<br>2. Drives when to beekeep<br>3. Money<br>4. Difficult to work with<br>5. Change s beekeeper's perception of how the hive is behaving<br>6. Beekeeper's ability to get out to the hives<br>7. Can the beekeeper go beekeeping after a storm<br>8. Easier to beekeep, less aggressive<br>9. Beekeeper prepares for a storm<br>10. Effects when beekeeper smokes and then a storm also happens on the hive |

TABLE 1-continued

| Data/Type of Measurement | Outcome for Hive | Outcome for User (e.g., Beekeeper) |
|---|---|---|
| | 14. What happened with the bees in Florida and hurricane<br>15. Do they forage from a tree, do they forage from the ground | |
| Length of daylight | 1. Ability to forage and bring back honey<br>2. Using phenology, bloom periods<br>3. Foraging earlier/later<br>4. Hive to heat up more, might need to cool hive<br>5. Might decrease nocturnal threats<br>    a. Increase stress and defensiveness<br>6. Flux and change of temperature<br>7. Bee orientation<br>8. Internal time clock moving might affect this<br>9. Decreases fungus growing in the hive<br>10. Increase pests<br>11. Ability to get honey | 1. $<br>2. When to feed, super, harvest and other activities<br>3. How long the beekeeper can be in the hive<br>4. Hive loss<br>5. Consider where to put hives<br>6. Treatments<br>7. More difficult to beekeep |
| | During a hive visit | |
| Need to know exactly what happens in the hive (that is measurable) when the hive is opened | Bees reaction to smoke | 1. Will be able to determine effect of opening the hive<br>2. Know whether the hive was opened |
| RFID on smoker | 1. What is the bees' behavior when they sense smoke?<br>2. Heat → rfid?<br>3. How the hives around one being smoked are affected | 1. Helps Bee Corp track hive visits for the beekeeper<br>2. How long the beekeeper was there<br>3. Affect perceptions of angry hives<br>4. Less honey harvested |
| Music<br>Recording of peaceful hive noises | 1. Frequencies, rhythms or pitches affect their behavior or communication<br>2. Which type of speakers<br>3. Beneficial or harmful | 1. More pleasant to do work<br>2. Helps with their mood<br>3. productivity |
| Length of intervention in each hive and apiary as a whole Maximum recommended time for various activities (feeding/routine check = short, treating for Varroa = longer) | 1. How this affects hive productivity/stress after leaving hive<br>2. longer = more stressful:<br>   1. more smoke<br>   2. temp regulation<br>   3. how much their productivity changes<br>   4. do scouts look for new place to go<br>   5. what's the queen doing<br>   6. shorter hive visits better for bees<br>   7. how long it takes them to get up to speed after<br>   8. nearby hives may be affected<br>   9. more stressed or less stressed with you there | 1. effects productivity<br>2. added stress<br>3. more strenuous on the body<br>4. accuracy they can see from bees<br>    a. too short also may overlook important things<br>5. less honey or overall hive productivity<br>6. swarms<br>7. lose #s<br>8. beekeeper will try to go less often to be quicker<br>9. bees may get used to scent<br>10. productivity<br>11. beekeeper's job may be easier or worse<br>12. less smoke needed |
| Length of time in the apiary | 1. hives nearby may be affected<br>2. more stressed or less stressed with you there | 1. bees may get used to scent<br>2. productivity<br>3. beek job might be easier or worse<br>4. less smoke needed |

TABLE 1-continued

| Data/Type of Measurement | Outcome for Hive | Outcome for User (e.g., Beekeeper) |
|---|---|---|
| Smoke detector | | Know when beekeeper is in hive |
| Lime treatments around the hive | 1. Small hive beetle levels<br>2. Aroma have effect on communication in the hive<br>3. Lime getting carried inside the hive, does this have an effect<br>4. Affect water supply | 1. Might not work for pollination site<br>2. More or less sensitive to beekeeping<br>3. Tainted honey<br>4. Deformities<br>5. Lost bees<br>6. Lost equipment<br>7. Lime might affect frame or feeder |
| Chemical treatments | 1. Does this affect the hive adversely?<br>2. Gets rid of pest<br>3. Life of queen<br>4. Long term affects<br>   a. Do the chemicals linger<br>   b. Cause deformations<br>   c. Next generation can fight or can't fight disease<br>   d. Comb in the hive<br>   e. Honey<br>5. Is the treatment contained? Does the chemicals spread to other hives<br>6. Chemicals interacting (other treatments and pesticides<br>7. Impact on behavior<br>8. How they affect the bees productivity<br>9. Zombie bees | 1. Breeding poorly adapted bees<br>2. Toxic for beekeeper<br>3. Protective gear<br>4. Frequency and time needed<br>5. Timing of the application, might happen on an unexpected slow<br>6. Cause bees to swarm<br>7. Behavior changes so beekeeper doesn't recognize the natural state<br>8. Confusion on which treatment to use<br>9. Lose hive or not lose<br>10. Replace the queen<br>11. Education needed on what the problem is and the right treatment<br>   a. What level of infection is necessary for treatment<br>12. weak hives, treat more, feed more, more attention needed<br>13. purchase more comb and reinstall it and foundation<br>14. could lose honey crop<br>15. could get sued<br>16. knowing how much is too much, affect the beekeeper's perception of the hive<br>17. less pleasant to work with |
| Smoker fuel types | 1. Harm caused to bees<br>2. How this affects hive productivity/stress after leaving hive<br>3. Sends signal to hive<br>4. Toxins released effect bees<br>5. Is it the smoke or the typical things used, is there an alternative?<br>6. Eat their honey<br>7. Does ink/white paper/newspaper affect bees<br>8. Calm bees with scent or aroma | 1. How long the fuel lasts<br>2. How expensive and easy it is to get<br>3. Health problem<br>4. Difficult or easy to light<br>5. Condition the bees with different scents |
| Size of smoker used | 1. Don't have hot smoke with bigger one<br>2. Does it matter how big the holes are<br>3. Bigger more powerful with smoke | 1. How long the fuel lasts<br>2. Cost difference<br>3. Harder to clean |
| Beekeeper is stung (number of stings, time between stings) | 1. What happened inside the hive immediately<br>2. What happened after next visit<br>3. Change in productivity<br>4. What is the reaction<br>5. Which bees react<br>6. What do the drones do? | 1. Uncomfortable<br>2. Stop beekeeping<br>3. Makes you mellow<br>4. Stop working in the hive<br>5. Affects your day<br>6. Masks the hive<br>7. Probability of getting stung again |

TABLE 1-continued

| Data/Type of Measurement | Outcome for Hive | Outcome for User (e.g., Beekeeper) |
|---|---|---|
| | 7. Changes in hive nearby<br>8. Is the pheromone universal<br>    a. Is their scent stronger<br>9. Bee smashed: does the bees give the pheromone or is it natural when the stinger is removed? Is there a difference in the two<br>10. Sting happens elsewhere, are the bees on edge<br>11. Is the pheromone different with different animals<br>12. What happens if the bee loosed his stinger anyway | 8. Medical treatments may be necessary<br>9. Is there a way to reverse it<br>10. Does it stay with the person who was stung |
| Footage of hive visit | 1. How many bees are in a frame<br>2. Software that could gauge the number of bees<br>3. % brood filled up | 1. Great for record keeping<br>2. When to put on a new super<br>3. Compare footage over time<br>4. Sense of speed in the hive<br>5. Able to go back and inspect hive in detail<br>6. Estimate mite levels<br>7. Different honey flows happening<br>8. How long honey has been capped<br>9. See the life cycle of the bee<br>10. Finding queen<br>11. Someone live viewing to look for specific problems<br>12. Beekeeper support<br>13. Online classes<br>14. Clips for classes |
| Alternative disease treatments | 1. Interferes less with the chemicals with pheromones<br>2. Less toxic<br>3. Not effective | 1. Might be wrongly targeted<br>2. Less risk on contaminated honey |
| Pheromones | 1. Stress levels after intervention<br>2. Pheromone is specific to disease or disruption<br>    a. Either it is different<br>    b. Whether there is anything that blocks them (parasite or disease)<br>3. What causes the pheromones to be emitted<br>4. Communicate with other bees, is it just alarms<br>5. Can they overpower the queen<br>6. Difference between active and passive pheromones<br>7. Where food sources are<br>8. Conditions of the hive<br>Food: | 1. Depends on whether they can be detected by humans<br>2. Used to manipulate the hive<br>    a. Threatening presence, etc. |
| Time of day bees are fed | 1. Whether they forage less<br>    a. Can this help them<br>2. Do they work at night? If so then feeding can be strategic<br>3. When do they eat<br>4. Number of foragers that leave<br>5. Less nutritious honey | 1. Timed delayed sensor to help feed bees<br>2. Less honey and money<br>3. Less valuable honey<br>4. Less nutritious honey<br>5. Weaker genetics over time<br>6. More food overall for the bees<br>7. Time of day that is optimal to feed<br>    a. May be more receptive to it in evening |

TABLE 1-continued

| Data/Type of Measurement | Outcome for Hive | Outcome for User (e.g., Beekeeper) |
|---|---|---|
| Vitamin supplements fed to bees | 1. Could breed them to be reliant<br>2. Less resistant to health problems, or more<br>3. Enhance nutritional value of honey<br>4. Stronger bees in short term | 1. Becomes a necessity<br>2. Genetic trait good or bad<br>3. More money spent<br>4. Higher chance of hive success |
| Food type fed to hive (agave, sugar, maple syrup, honey) | 1. Certain types of sugar harm the hive<br>2. Consistence with water-what level<br>    a. Are certain feeds better at different times of the year | 1. Could take out frames and store them for later feeding (like after a spray)<br>2. Does this get into honey<br>3. Differing costs<br>4. Different time spent prepping |
| Overwinter feeding | 1. Survivability<br>2. How frequent they need it<br>3. Do they need it year round or do they take when they need<br>4. Sense of conserving?<br>5. Prevent starvation<br>6. Stronger in spring and could swarm<br>7. Regularly, though winter, getting out when warm<br>8. In warm weather when they look for food (optionally plant for warm days)<br>9. Length that it is inside the hive<br>10. Which type is better | 1. Might save hive<br>2. Flexible in winter to visit hives<br>3. Cost and time spent doing this<br>    a. Time spent checking it, depending on type<br>4. Add supers or switch out frames of honey |

Genetics:

| Data/Type of Measurement | Outcome for Hive | Outcome for User (e.g., Beekeeper) |
|---|---|---|
| Type of bee (Italian, Russian, etc.) | 1. Overwintering success<br>2. Honey production<br>3. Ability to defend hive from robbing and other threats<br>4. More mite and disease resistant<br>5. Better at reproduction<br>6. Queen difference in acceptability into hive and lifespan | 1. Aggressiveness (stinging)<br>2. Price buying and selling hives<br>3. How many times you treat<br>4. Who your customer is<br>5. Pollination effectiveness<br>6. Honey production<br>7. Affect breeding practices<br>8. Time spent in the hive<br>9. Whether you want to check on them or not |
| Location queen was bred | 1. Success of eggs in environment<br>2. Better more effective mating or a queen who has been conditioned to the climate<br>3. Overwintering success<br>4. Elevation: does this chance her distance in the air, or is it based on the distance to the ground<br>    a. Does this increase predators | 1. Cost<br>2. How easy it is to get it<br>3. Could save a hive<br>4. Chance of requeening success |
| Who the breeder is | 1. Mite resistance<br>2. Experience in years<br>3. Traits the beek favors<br>4. Overwintering success with queens<br>5. Methods they use to identify traits (Purdue and insemination, good record keeping, Beekeeper memory) | 1. Price<br>2. Reputation and relationships<br>3. Resources used<br>4. Ability to give customer service |
| Which traits were selected | 1. Aggressiveness<br>2. Resistance<br>3. Production<br>4. How long they have hone it for | 1. Get to pick what you prefer<br>2. Price<br>3. Aggressive queen + tame hive = will this work? |
| Wing span & thickness | 1. Foraging distance & ability to seek out plants<br>2. Mating distance and height<br>3. Energy used in flying<br>4. How much they can carry | 1. Honey crop<br>2. More valuable honey<br>3. survivability |

TABLE 1-continued

| Data/Type of Measurement | Outcome for Hive | Outcome for User (e.g., Beekeeper) |
|---|---|---|
| | 5. How long they live<br>6. Food they eat/plants<br>7. Capacity in hive: super more often?<br>8. Cool the hive | |
| Bee Color | 1. different from standard, might affect their aggression<br>2. heating and cooling<br>3. Italians might be more of a warning to other animals<br>4. Might affect how bees see each other | |
| Splits | 1. Survival rates<br>2. Difference in late splits vs spring splits in survival and productivity<br>3. Honey production (different between old and new hive?)<br>4. If need to build out comb = reduced production<br>5. Overwintering success for both hives | 1. Timing, need to get this right<br>2. Amount of equipment purchased<br>3. Save hives and revenue<br>4. Which one do you move away |
| Emergency queen | 1. Survival rates<br>2. Acceptance rates<br>3. Stressful<br>4. Break in brood production<br>5. Change in bee duties: foraging/house tasks<br>6. Honey production<br>7. Break down in other tasks down the line<br>8. Temperature regulation<br>9. Lifespan effects<br>10. Eggs and larvae effects<br>11. Time or problem with mating<br>12. Not as good laying as other queens<br>13. Shorter lifespan | 1. More frequent checks<br>2. Risk of losing hive<br>3. Less honey<br>4. Might indicate weak hive |
| Mail order queen | 1. Survival rates<br>2. Acceptance rates<br>3. Stressful<br>4. Might not be accepted<br>5. Break in rood production<br>6. Change in bee duties: foraging/house tasks<br>7. Honey production<br>8. Break down in other tasks down the line<br>9. Temperature regulation<br>10. Change in the genetics (could be good or bad)<br>11. Lifespan effects | 1. Cost of queen<br>2. Risk of getting a bad or dead queen<br>3. Time spent finding queen and waiting for shipping |
| Creating grooming behavior | 1. Cleaner hive<br>2. More disease and pest resistant | 1. With certain equipment?<br>2. Prevent Dirt entering hive?<br>3. Less risk of losing hive |
| RFID on queen | 1. How fast she goes<br>2. Pre mating:<br>  a. Time spent before mating<br>  b. How far she goes<br>  c. Will she even mate?<br>3. Post mating<br>  a. How she moves over frame<br>  b. Where she spends the day<br>  c. Rate of laying<br>4. Effects on life expectancy<br>5. Effects on communication | 1. What frames have been laid in<br>2. When larva is going to emerge<br>3. This makes preparing nucs easier to find queen<br>4. Tells you if she is alive<br>Tells you if she mated |

TABLE 1-continued

| Data/Type of Measurement | Outcome for Hive | Outcome for User (e.g., Beekeeper) |
|---|---|---|
| About the hive: | | |
| Propolis levels | 1. Pest levels in the hive<br>2. Seals up hive from wind and pests<br>3. Does it get too old? | 1. Indicates strength<br>2. annoying |
| Number of foragers | 1. Honey production<br>2. Too many foragers: too little food, what happens? | 1. Strength of hive<br>2. More time supering<br>3. When to move the hives<br>4. What hives to move |
| Gases inside the hive | 1. effects communication<br>2. harmful to health? Effects bees like beekeepers?<br>3. Volitazation of fertilizers and pesticides<br>4. Lingering of smoke from beekeeper? | 1. Indicates bad ventilation<br>2. Beekeeper exhales, effect hive, makes it more stressed out |
| Weight | 1. Population size<br>2. Proportions of workers to drones<br>3. Honey production<br>4. Foraging behavior and number of bees<br>5. Effect on temperature regulation<br>6. Consumption: per day, during the day | 1. When to start feeding<br>2. When to take honey off<br>3. When to split hives<br>4. Human robbing<br>5. Optimizing pollination trucking load<br>6. Effect of a hive check on weight<br>7. When to super<br>8. Winter: whether hive had enough food<br>9. How much to extract and feed in the fall<br>10. Different nectar sources weight different |
| Cause of death | | 1. How to best treat equipment upon death<br>2. What went wrong and what can the beekeeper do<br>3. Change of it affecting living hives |
| Multiple hives in apiary | 1. Robbing<br>2. Competition for food<br>3. Higher chance of mite and disease transfer<br>4. Ability to communicate within hive | 1. Saves time<br>2. Uses hives to help out struggling hives<br>3. Easier to understand problems in hive |
| Varroa mite load (sticky board, other testing methods) | 1. More diseases and fungus vulnerability<br>2. Break in brood cycle<br>3. Attention needed to get rid of them, draws away from other tasks | 1. Alert beekeeper when it reached a critical point<br>2. Force break in brood cycle<br>3. Time taken to detect<br>4. Treatments needed<br>5. Hive survivability |
| Small hive beetle levels | 1. Affect production<br>2. Affect hive tasks<br>3. Reduce population growth<br>4. Ruin honey stores and comb<br>5. 5. Spread of diseases | 1. Alert beekeeper when it reaches a critical point<br>2. Time spent treatment<br>3. Lost hive |
| Wax moth levels | 1. Affect production<br>2. Affect hive tasks<br>3. Reduce population and growth<br>4. Ruin honey stores and comb<br>5. Spread of diseases | 1. Alert beekeeper when it reaches a critical point<br>2. Hive placement need changed<br>3. Type of foundation purchased<br>4. Time spent cleaning frames |
| Location | 1. Wax moth levels<br>2. Food availability<br>3. Competition<br>4. Risk of pesticides | 1. Optimal travel routes<br>2. Accessibility<br>3. Hot or cool beekeeper<br>4. Chance of hive survival<br>5. Ease of emergency intervention |
| Pheromones | 1. Intruders<br>2. Supercedure<br>3. New queen acceptance/resistance<br>4. Job assignments<br>5. Communication<br>6. More info from queen | Pheromone affects hive |

TABLE 1-continued

| Data/Type of Measurement | Outcome for Hive | Outcome for User (e.g., Beekeeper) |
|---|---|---|
| Hive splits | 1. Did they survive<br>2. Compare late splits vs spring splits | |
| Emergency queens | | Look at ordered queens and transferred frames |
| Hive is moved | 1. Lost foragers, production<br>2. Need orientation<br>3. Increased stress<br>4. New climate, pests, diseases<br>5. New food sources and pesticides (does previous immunity translate to a new one)<br>6. Less resistant to threats in both areas<br>7. Might affect brood raising<br>8. Foraging, memory, does this change?<br>9. 3 ft vs 3 mile rule | 1. Hive and money<br>2. Less valuable pollination contract<br>3. Less pleasant to work with, more aggressive<br>4. Tainted honey and usability<br>5. Cant split hives<br>6. Decreased honey production and overall value<br>7. Best to move in bad weather |
| | Bee Proportions: | |
| Number of drones | 1. Mating success<br>2. Honey consumption<br>3. Temp regulation<br>4. More mites<br>5. Less honey production<br>6. Affect flow of work for workers<br>7. What does no drones mean | 1. Less stings<br>2. Take drone frames out for varroa mgt<br>3. Easily monitor varroa |
| Proportion of new bees ("hairy bees") | 1. Number of new bees/breeding rate<br>2. Less foraging<br>3. More bees for house tasks<br>4. More varroa<br>5. Queen lay rate | 1. Maybe more treatments<br>2. Ability to treat |
| Proportion of winter bees ("fat bees") | 1. Preparing for winter<br>2. Weather affecting when this prep happens<br>3. Winter length affecting their survival | 1. Getting ready for winter<br>2. Indicates need to get hive ready for winter |
| | Comb: | |
| Age of the comb | 1. Whether it is more conducive to the spread of disease<br>2. Whether it retains pesticides<br>3. Less effort to build out comb = more honey<br>4. Effect on larvae<br>5. More susceptible to pests<br>6. New comb: less foraging? | 1. Alert that the beekeeper should replace comb<br>2. Fully drawn more susceptible to pests in storage<br>3. Harder to store<br>4. More revenue from not needing bees to build out<br>5. Taking out old comb = increased labor<br>6. Need for treatment<br>7. More likely to blow out in extraction<br>8. Builder of bee chemicals |
| Comb size/Bee size (correlated) | 1. Varroa mite levels in hive<br>2. Build up of pesticides<br>3. Collecting nectar and pollen<br>4. Dealing with predators<br>5. Distance traveled<br>6. Sting<br>7. Effects communication<br>8. More work for queen<br>9. Flow of traffic easier<br>10. Duration of larvae development<br>11. Change in time it takes to cap the honey<br>12. Best for honey or brood frames<br>13. Life span<br>14. Confusion with difference in cell size<br>15. Same size = better laying pattern | 1. Need for treatment<br>2. Beekeeper can control this |

TABLE 1-continued

| Data/Type of Measurement | Outcome for Hive | Outcome for User (e.g., Beekeeper) |
|---|---|---|
| Size of drones/Comb size | 1. Mating success<br>2. Varroa mite levels<br>3. Honey eaten<br>4. Correlated to stronger hive<br>5. Life span<br>6. Temperature in hive<br>7. Space available to move in hive<br>8. Produce more waste<br>9. Affect behavior (if none, hive stressed, etc)<br>10. Harder to kick out in the fall | 1. More success with queen breeding<br>   a. Might use this in drone selection genomics<br>2. Beekeeper can control this |
| Presence of brace comb | 1. More wax available<br>2. Queen laying pattern<br>3. Strong hive | 1. Need more space<br>2. Effect sensor install and transmission<br>3. Might be sign comb is too old<br>4. Annoying<br>5. Indicates wrong equipment sometimes<br>6. Might indicate swarm |
| Amount of drone brood in the hive | 1. Worker bee population<br>2. Increase mite levels<br>3. Honey consumption<br>4. Need for communication between nurse, queen, and rest of hive | 1. Might indicate swarming<br>2. Effect treatment frequency<br>3. Need to create break in brood rearing cycle |
| Frame weight | 1. Population<br>2. Capped cells<br>3. Honey<br>4. Strength of hive<br>5. Temperature in winter | 1. Difference in weight might show what's in the comb<br>2. Harder to handle by beekeeper<br>3. Time to add another super<br>4. Overwinter trends<br>   a. Eating honey, etc<br>   b. Shows need feed<br>5. When honey flow is beginning and ending<br>   a. Know when to move or feed |
| Laying pattern | 1. Strength of the queen<br>2. Diseases<br>3. Queens movement throughout the hive<br>4. Age of the queen<br>5. How effectively she was mated<br>6. Communication between queen and nurses capping cells<br>7. Temp in hive<br>8. Temp regulation<br>9. Increase robbing<br>10. Increase robbing<br>11. More labor to clean up with solid<br>12. Effect humidity levels<br>13. More susceptible to high winds and low temp in the winter<br>14. Indicates health of the comb<br>15. Grooming behavior | 1. Whether to treat to requeen<br>2. Which frames are visited the most<br>3. Maintenance<br>4. Screened = easier to do sticky board<br>5. When honey flow is happening |

Equipment:

| Data/Type of Measurement | Outcome for Hive | Outcome for User (e.g., Beekeeper) |
|---|---|---|
| Preventing dirt being brought in | 1. Cleaner hive = healthier and more productive hive<br>2. Plenty of honey<br>3. Knock off pollen<br>4. Knock off mites<br>5. Dependent on this, and could lead to poor grooming behavior | 1. Less labor cleaning hive in spring<br>2. Frequency of cleaning |

TABLE 1-continued

| Data/Type of Measurement | Outcome for Hive | Outcome for User (e.g., Beekeeper) |
|---|---|---|
| Wrapping during winter | 1. Survivability<br>2. Warmer inside hive<br>3. Overheat hives or mild days<br>4. False idea of real temperature<br>5. Affects their ability to control temp in spring<br>6. Hard to find hive because not used to color | 1. Skew temp data<br>2. When to wrap and unwrap<br>3. Extra labor at end of year<br>4. Expensive |
| Bottom board style | 1. Screened = better for ventilation<br>2. Easier to groom | 1. Cheaper for beekeepers<br>2. Easy to build on own |
| Ventilation | 1. Ability to control humidity in winter<br>2. Increase survivability<br>3. Mite levels<br>4. Honey capping<br>5. Gases get in the hive<br>6. Extreme weather = less work for bees, and they don't have to beard<br>7. Greater exposure to weather | 1. Beek can manipulate this<br>2. More labor to prep hives<br>   a. Drilling holes, etc |
| Carbon filters | 1. Increase productivity after hive check<br>2. Release trapped gases<br>3. Less effort to ventilate<br>4. Winter ventilation | 1. Bees might try to clog it up<br>2. Money spent on it<br>3. Need power source<br>4. Another thing to check<br>5. Examine how it affects productivity |
| Hive foundation used | 1. Small hive beetle levels<br>2. Disease transmission<br>3. Affects productivity better<br>4. Confuse bees if not all same type of foundation<br>5. Condition bees to not know how to form comb naturally<br>6. Toxins exposed to hive through plastic<br>7. Hard to communicate through plastic<br>8. Queen laying speed | 1. Allows beekeeper to control for comb size<br>2. Cost associated<br>3. Honey production easier (plastic)<br>4. More durable (plastic)<br>5. Easier to assemble<br>6. (plastic) cant extract wax<br>7. More difficult to look at laying pattern if not as flat |
| Age of equipment | 1. Probability of holding disease<br>2. How bees regulate the temp (holes)<br>3. Blocking intruders<br>4. Bees like smell of old equipment<br>5. Mold could become a problem<br>6. Spend time using propolis to patch up damage<br>7. Old smokers, more toxic smoke on hotter | 1. Time to repair<br>2. Effort spent maintaining<br>3. Replacement equipment needed<br>4. More expensive to buy new<br>5. Equipment could fall apart when beekeeping<br>6. Time needed to clean smoker |
| Number of repairs to equipment | 1. Effect productivity of hive<br>2. Need to plug up new box | 1. More time needed for beekeeper<br>2. Change how you repair equipment<br>3. More costly with each repair |
| Type of comb foundation | How quickly it is filled out | |
| Number of frames used in honey super | 1. Less of a burden for the bees to build up instead of out<br>2. Changes capping of the honey<br>   a. Cost<br>3. More comb to build out<br>4. Need to build this out every season | 1. Easier for beekeeper to extract<br>2. More supers might be needed<br>3. Need to add additional supers more quickly |
| Size of super | 1. How quickly is it filled out?<br>2. How far up does the queen travel?<br>3. Hard to adjust if the sizes are different<br>4. Easier for bees to move around in smaller<br>5. Building out vs building up | 1. Deep is heavier<br>2. Smaller supers = more equipment<br>   a. Cost><br>   b. Maintenance><br>3. More storage needed<br>4. Less frequent to add another super<br>5. 8 frames weigh less |

TABLE 1-continued

| Data/Type of Measurement | Outcome for Hive | Outcome for User (e.g., Beekeeper) |
|---|---|---|
| | | 6. Super faster for 8 frame<br>7. Deep: more difficult to get bees off frame<br>8. More frames to extract, more time<br>9. Deep takes less time to extract |
| Number of supers used | 1. Survivability<br>2. Effects queen laying<br>3. Harder to regulate temp<br>4. Increase or decrease chance for pests<br>5. Related to pop size? | 1. Hard to extract with brood<br>2. Too tall for beekeeper<br>    a. More equipment<br>    b. Difficult to take off supers<br>3. More boxes to get through while beekeeping |
| Slope of hive | 1. Ability for water to drain<br>2. Effects of humidity and temp levels if water drains out<br>3. Effects comb building, cause gravity<br>4. Better for pests and pesticides | 1. Worry about tipping over<br>    a. Gets exaggerated more with more supers<br>2. Difficult to get to the perfect angle that is sturdy enough or the right piece of land |
| Entrance direction | 1. Temp regulation<br>2. Productivity<br>3. Foraging orientation<br>4. Into wind, cool down hive in summer<br>    a. Exposed to north wind in summer<br>5. How they store honey | 1. Sometimes tricky to accodomate<br>2. Know where the wind blows |
| Position of frames (honey outer, brood inner) | 1. Effects moisture content and humidity<br>2. Heat hive and keep alive in winter<br>    a. Easier to access food in winter<br>3. Harder for new bees to find food | Try to maintain the pattern |
| Infrared camera | Disturb bees behavior | 1. Beekeeping at night<br>2. Inspect productivity and comb<br>3. Tell if hive is alive in winter<br>4. Need to clean it<br>5. Laying pattern<br>6. How filled out frames are<br>7. Detect pests<br>8. How they are cluster and see how survival might be |
| Magnetic fields | 1. Foraging<br>2. Directions<br>3. Orientation<br>4. Swarming<br>5. Disease might affect how they read the fields, or injury | 1. Hive orientation (ie facing south)<br>2. Devices with magnets<br>3. Devices stored in the hive |
| Style of hive | 1. Less beekeeper disturbance with top bar<br>2. Swarm more in langstroth<br>3. Easier to clean langstroth<br>4. Communicate differently among the different hive styles | 1. Sensors installation is difficult<br>2. Non langstroth are hard to transport<br>3. Non langstroth have less honey generation<br>4. Top bars more natural<br>5. Warre insulate better<br>6. Langstroth easier to harvest honey<br>7. Top bar no foundation<br>8. Top bar is cheaper<br>9. Warre difficult to get equipment<br>10. Easier to maintain top bar, no lifting<br>11. Management styles<br>12. Difference in algorithms for temperature<br>13. Splits easier with langstroth |

TABLE 1-continued

| Data/Type of Measurement | Outcome for Hive | Outcome for User (e.g., Beekeeper) |
|---|---|---|
| Color of hive | 1. Ability of bees to spot the hive<br>2. Amount it reflects heat<br>3. Humidity might dissipate faster<br>4. Affects foraging on flowers<br>5. Red makes bees more aggressive, or does color affect mood<br>6. Changing the color over the season affects them<br>7. Geographically, are different colors have different impacts | 1. Color might influence theft<br>2. Easier to paint whatever color, cheaper to buy paint |
| Type of top cover used | 1. Amount of ventilation<br>2. Amount of humidity<br>3. Internal temp and regulation<br>4. Telescoping drives water away from the hive<br>5. difference in the amount of pests that get in the hive<br>6. amount of propolis put on or added<br>7. room between inner cover might have an effect | 1. Ease of transportation<br>2. Time of hive checks<br>3. Ease of feeding<br>4. Different prices<br>5. Telescoping lid more likely to fly off<br>6. Telescoping more durable |
| | Factors used in pollination contracts: | |
| Rate of foraging (RFID on foragers) | 1. Health/strength of hive<br>2. Increased chance of survival<br>3. How fast they are<br>4. How much time they spend outside the hive<br>5. Genetic trait?<br>6. How many foragers in the hive<br>7. How much honey they bring in<br>8. Indicates strong hive<br>9. Indicates age of the queen<br>10. Percent of the population that are drones<br>11. Size of the bees<br>12. Breed<br>13. How much the bee can carry | 1. Determines prices<br>2. Increases negotiation power for the beekeeper |
| Transportation style | 1. More bees, more hot<br>2. More stressful to ship in large groups | 1. Might change the costs of shipping<br>2. Trucking or flying bees<br>3. Stops to check<br>4. Determines who is a t fault |
| Transportation distance | 1. More harmful for the bees<br>2. Higher risk of overheating<br>3. More stress<br>4. Bigger risk of dying<br>5. Latitude or longitude might affect their orientation<br>6. More likely to be exposed to inclement weather<br>7. More exposed to emissions for longer | 1. More stops<br>2. More expensive for the beekeeper for longer (might have to hire two drivers, etc)<br>3. Have to abide by state regulations<br>4. Can get pulled over for not having secured hives<br>5. Amount of pollination contracts that can be entered<br>6. If the beekeeper has to tend to them, it is more money<br>7. Longer distance, harder to replace them to honor pollination contracts |
| Acceleration or velocity reached | 1. Whether this negatively affects them<br>2. Higher speed means more wind, might affect temp regulation and humidity<br>3. Vibrations might have effect on their ability to communicate<br>4. More likely to break the seal on the hive | Affects how well they have to secure the hives |

TABLE 1-continued

| Data/Type of Measurement | Outcome for Hive | Outcome for User (e.g., Beekeeper) |
| --- | --- | --- |
| Knowledge about a hive when in holding yards | Health of hive Whether they're effective in calming/acclimating bees, feeding performed, distance between holding yard and pollination site | 1. Wanting to know the health of the hives<br>2. Risk of theft<br>3. Adequacy of feeding<br>4. Improve productivity for hive checks<br>5. Higher pollination fees, or cut of the fee<br>6. Hard to build trust between the beekeeper and the broker<br>7. More security for the grower or broker<br>8. Improves the layover time f they have to be inspected |
| Other: | | |
| Honey prices | 1. How it affects the bees<br>2. Is the highest value honey for humans as good for nutrition for bees<br>3. If the beekeeper extracts more, this could harm the bees<br>4. Different crops might have more nutrition, but if they taste better more likely to be taken away from the bees | 1. Optimal times to sell honey<br>2. Optimal crops to pollinate<br>3. Bottling size<br>4. Channel it is sold through<br>5. Who conducts the extraction<br>6. How much the beekeeper extracts |

Figure 6:
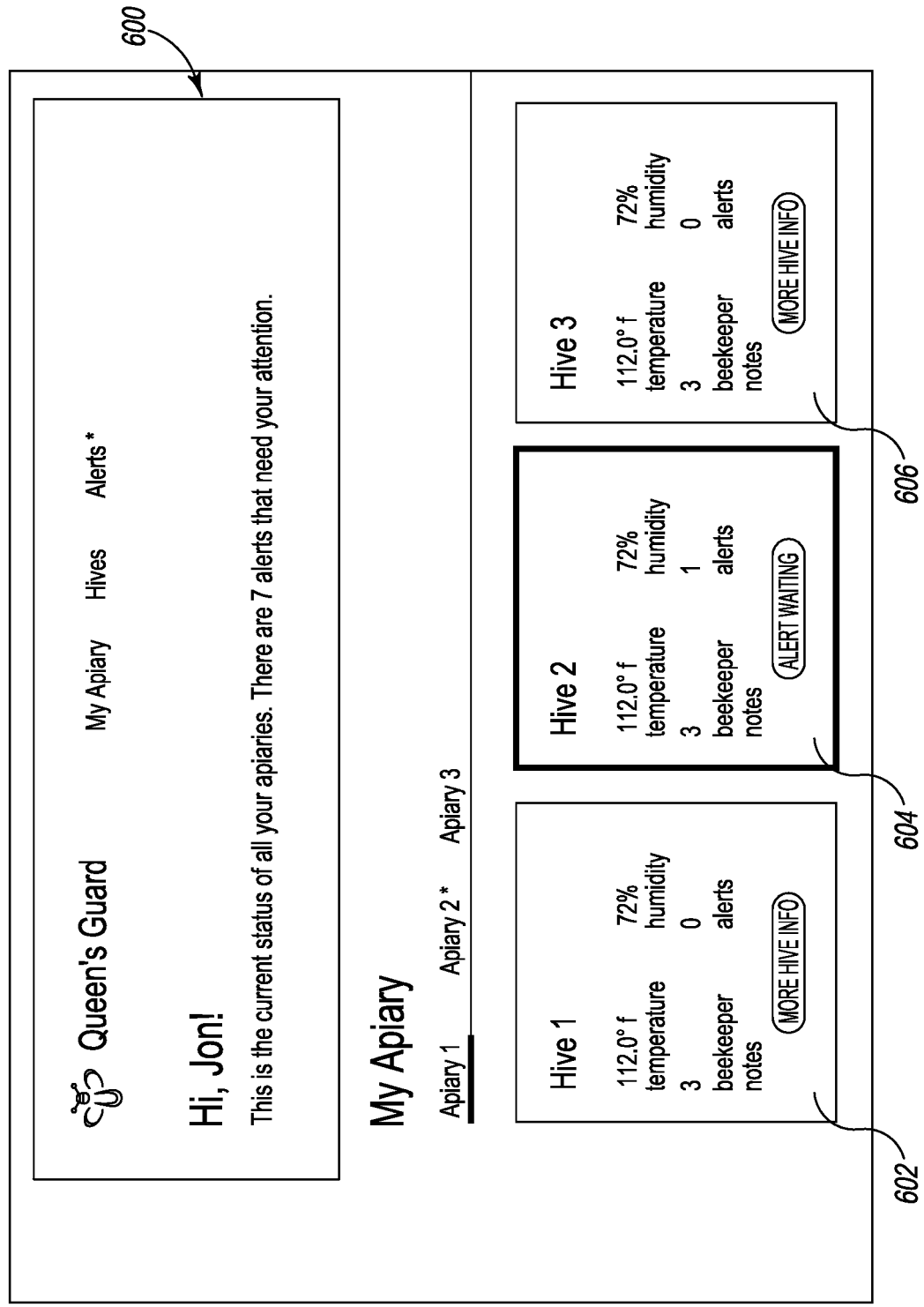
FIG. 6 is an illustrative user interface disclosed herein.

FIG. 6 illustrates an example first user interface 600 which may be rendered via the dashboard interface manager 306 to the display of the client computing device 128 to enable a user to monitor and/or control the beehives 102. In the illustrative embodiment, the user interface 600 includes interactive graphical icons 602, 604, 606, each displaying information related to one of the beehives 102. For example, the graphical icon 602 displays information related to the beehive 102 named "Hive 1" such as, for example, a temperature of the beehive 102, a humidity level of the beehive 102, a number of user-inputted notes associated with the beehive 102 and accessible via the user interface 600, and a number of alerts associated with the beehive 102. Other examples may include additional and/or alternative information. A user may interact with (e.g., click on via a mouse, tap via a touchscreen, etc.) one of the graphical icons 602, 604, 606 to view additional user interfaces and/or information related to the beehives 102.

Figure 7:
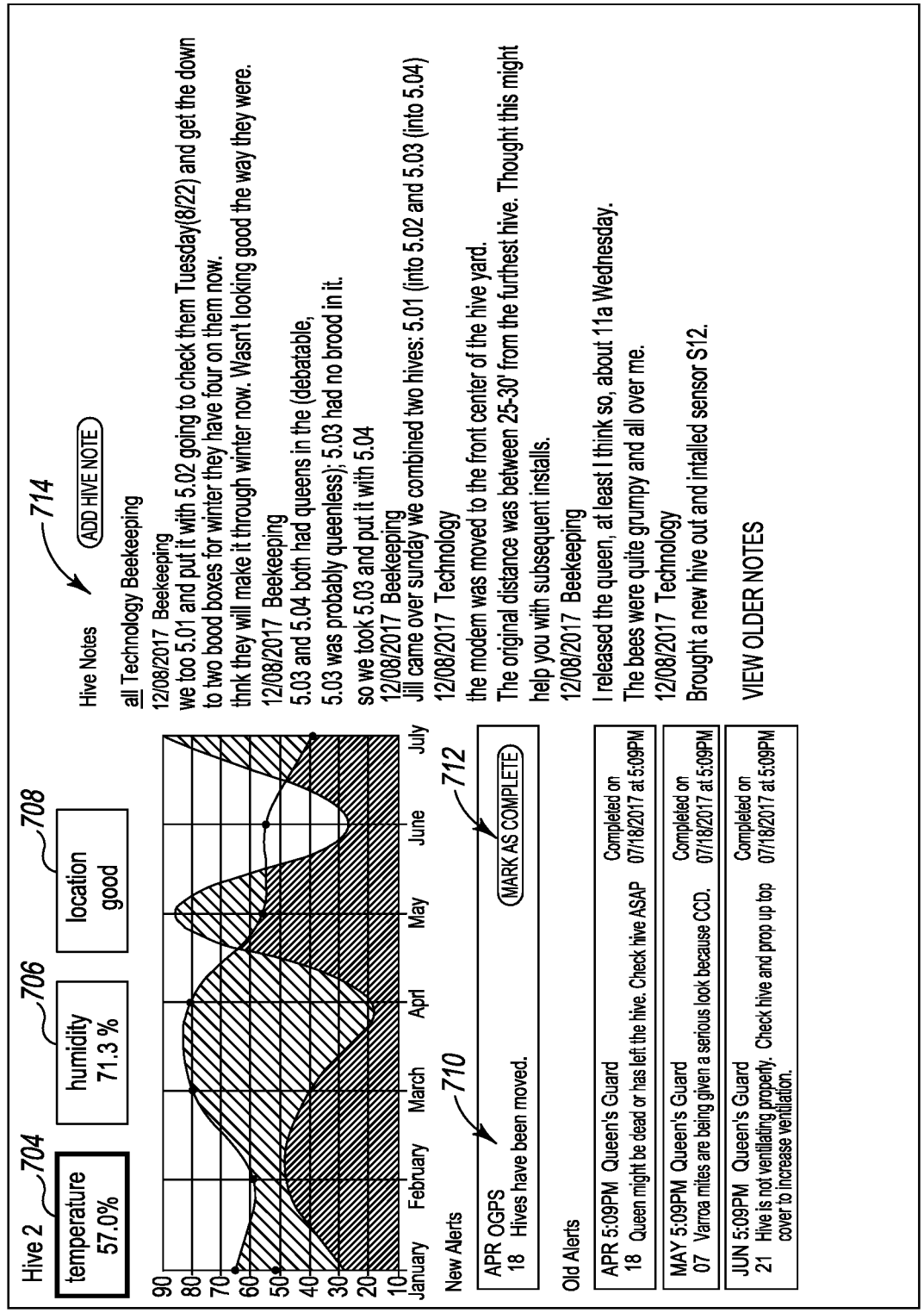
FIG. 7 is another illustrative user interface disclosed herein.

FIG. 7 illustrates an example second user interface 700 displaying information related to the beehive 102 associated with the graphical icon 604 of FIG. 6. In some embodiments, the second user interface 700 is accessed and/or displayed when a user interacts with the graphical icon 604 of FIG. 6. In the illustrative embodiment, the second user interface 700 includes a graph 702 indicating temperatures and humidity levels of the beehive 102 based on information detected via the sensor(s) 104 over time. The second user interface 700 also displays a current temperature 704, a current humidity level 706, and an indication 708 as to a current location of the beehive (e.g., whether or not the beehive 102 is in a predetermined or desired location). The illustrative second user interface 700 includes alerts 710 related to the beehive 102 and statuses 712 associated with the alerts 710. For example, one of the alerts 710 indicates that "Queen might be dead or has left the hive. Check hive ASAP" and the status 712 associated with the alert 710 indicates that the user checked the beehive 102. In the illustrative embodiment, the user may edit and/or update the statuses 712 to indicate an action was taken in response to receiving the alerts 710. The second user interface 700 further includes notes 714 and/or additional and/or alternative information input by the user.

FIG. 8 illustrates the second user interface 700 of FIG. 7 displaying a map 800. In the illustrative embodiment, the map 800 includes an indicator 802 indicating a location of one or more of the beehives 102 on the map 800. In some embodiments, the map 800 may be dynamically updated such that the user may monitor a location of the beehive(s) 102 to determine if the beehive(s) 102 are moving.

As demonstrated above, the application of analytics to data collected from beehives can help growers ensure effective pollination. Use of the following embodiments described below decreases costs for growers by monitoring the number, health and distribution of pollinating bees. For a small amount per hive inspected, these embodiments allow growers and beekeepers to take infrared (IR) imagery from a smartphone attachment (or other IR imaging device) to automatically calculate the number of frames of bees inside the hives. As used herein, colony strength, size, and population are all synonymous. The colony refers to the cluster of bees, while the hive refers to the physical wooden structure as well as the bees inside.

Observing and recording the number of frames of bees in colonies throughout the year gives a much clearer picture of a colony's overall health by providing a seasonal history of its strength and size based on fluctuations in adult bee populations. In the past, a simple estimate of a hive's adult bee population required the beekeeper to crack the lid and smoke the top box gently. After the lid is removed and the top brood box is located, the beekeeper counts the number of frames covered with bees. In some cases, this can be accomplished without having to remove any of the frames by simply looking between each frame and counting the frames that are entirely or mostly covered with adult bees. In other situations, the frames must be removed to get an accurate assessment. This procedure is followed for each brood box, and the results are added together to get an estimate of the adult population of a hive expressed as frames of bees. This prior art methodology clearly creates an unwanted disturbance to the hive.

Pollination revenue ($655 million) makes up over half of the total beekeeping market, where over 90 crops need honeybees for proper pollination. Currently, growers in need of pollination will rent beehives from beekeepers, and the beekeepers seasonally move their hives to the grower's location for pollination. Almond pollination generates the highest demand for pollination, requiring ¾$^{ths}$ of the nation's beehives. For almond growers, their main concern is renting enough strong hives to pollinate their orchard, since 100% of an almond crop is reliant on honeybee pollination. If the growers do not rent enough hives above a minimum strength, they will produce lower yields that season.

Growers pay for hives based on colony strength, measured by the population of bees inside the hive, since this is directly related to the amount of pollination that a hive can perform. If a grower or a beekeeper thinks the price is wrong or is worried about hive strength, they can request a hive inspection. If an inspection reveals that some of the hives were weak or dead, the grower will contact a beekeeper and rent more hives.

In these inspections, hives are pried opened and the frames covered with bees are tallied to determine the frame count. Prices for hive rentals are then determined based on the average number of frames across all hives sampled. Inspections are done by hand at a rate of 7 hives per hour and are typically performed on a limited sample of 10-15% of hives rented. Because manual inspections rely on human judgement based on a small sample, they are inaccurate measurements of colony strength. Manual inspections are also stressful to the bees—they will not forage for 2-3 days after an inspection—resulting in lost pollination time for the grower.

The digital hive grading tool embodiments disclosed herein increase the accuracy of hive grading and can work without opening hives. Since manual inspections rely on human judgement, disputes often arise on the quality of the inspector. Using the embodiments disclosed herein, the hive grading data is undisputed as it is based in an unbiased methodology that grades identically across all hives. The embodiments disclosed herein also help beekeepers. The pre-pollination season hive inspections performed to verify that hives meet the minimum strength required by pollination contracts is a very labor-intensive task.

The hive grading embodiments disclosed herein also allow collection of colony size information for use in honeybee research (such as nutrition, pesticide impacts, etc), where this tool can be a more objective and affordable method of data collection. An often-cited problem in data collection is pesticide usage and its harmful effect on honeybee populations. Data collected from the embodiments disclosed herein can be used as a benchmark to test the impact of pesticides on honeybee populations. Currently in pesticide permitting, hive colony size endpoints are used to measure the impact of pesticides on these nontarget organisms. The IR analysis capabilities of the embodiments disclosed herein may also be applied to new verticals, including manufacturing, medical, agriculture, and energy sectors, to name just a few non-limiting examples.

The hive grading embodiments disclosed herein cut down the labor time required to get the hives ready for pollination by 93%. Easy-to-collect strength data also allows the beekeeper to increase transparency and reinforce growers' confidence in their decision to maintain their business relationship by demonstrating the value their bees provide. Beekeepers can also use the product as a point of comparison to other hives on the market, which they can use to justify better prices during negotiation.

In some embodiments, the digital hive grading tool uses infrared (IR) images of the hive. In order to establish the algorithm to use for the digital hive grading tool, data was collected by taking an infrared image of the hive and pairing the image with a manual inspection frame count. Images were collected from a variety of commercial beekeepers, which allows us to get a vast variety of data from beehives. The IR images were captured first, then hives were inspected and assigned frame counts. This order was important because opening the hive could affect the IR heat signature. IR image data and frame counts were collected consecutively—typically within minutes of each other—to ensure the two data points represented the colony at the same point in time. Data was collected from various beekeepers from California, Michigan and Florida. In total 3,197 IR images paired with frame counts were collected, and 6,489 IR images of hives were captured. In some embodiments, the IR images may be captured with a FLIR One Pro thermal camera that functions as an attachment to a smartphone, such as an IOS device. In some embodiments, the manual frame count data and other information noted by the inspector may be stored as metadata associated with each image.

Environmental sensors were installed in a research apiary to record local temperature and humidity values at the site. Environmental sensors were also installed inside the hives to record hive temperature and humidity, and weight sensors were installed to capture hive weight. Hive entrance traffic counters were also installed. Collected data was paired with open source data, such as weather or solar data to better capture ambient conditions affecting the temperature of the hive. Weather and solar data are triangulated from multiple sources (Table 2). Weather and solar data are relevant because ambient weather factors impact heat captured in the IR images. The environmental and open source data are used to validate the physics model by comparing the thermodynamics in the physics model to the actual temperature flow inside the hive.

TABLE 2

| Source | Data Type |
| --- | --- |
| Dark Sky | Weather |
| Weatherbit.io | |
| Wolfram Alpha | |
| Weather Underground | |
| National Solar Radiation Database | Solar |
| Sunset - Sunrise | |
| Honeybee.net | Weight, nectar flow data |
| Google Image search | Hive images for segmentation |

During use of the FLIR One Pro IR image sensor in some embodiments, the camera was turned on in temperatures between 55-90° F. and it was ensured that the object being measured was above 32° F. Distance tests were also performed, where images were taken at 3, 5, 10 and 15 feet away from the hive. The closer the IR image sensor was to the hive, the greater resolution the thermal image contained. If an image is taken too close, however, the hive segmentation process (discussed below) is impaired. In some embodiments, images that were captured 3-6 feet from the front of the hive performed best.

Figure 9:
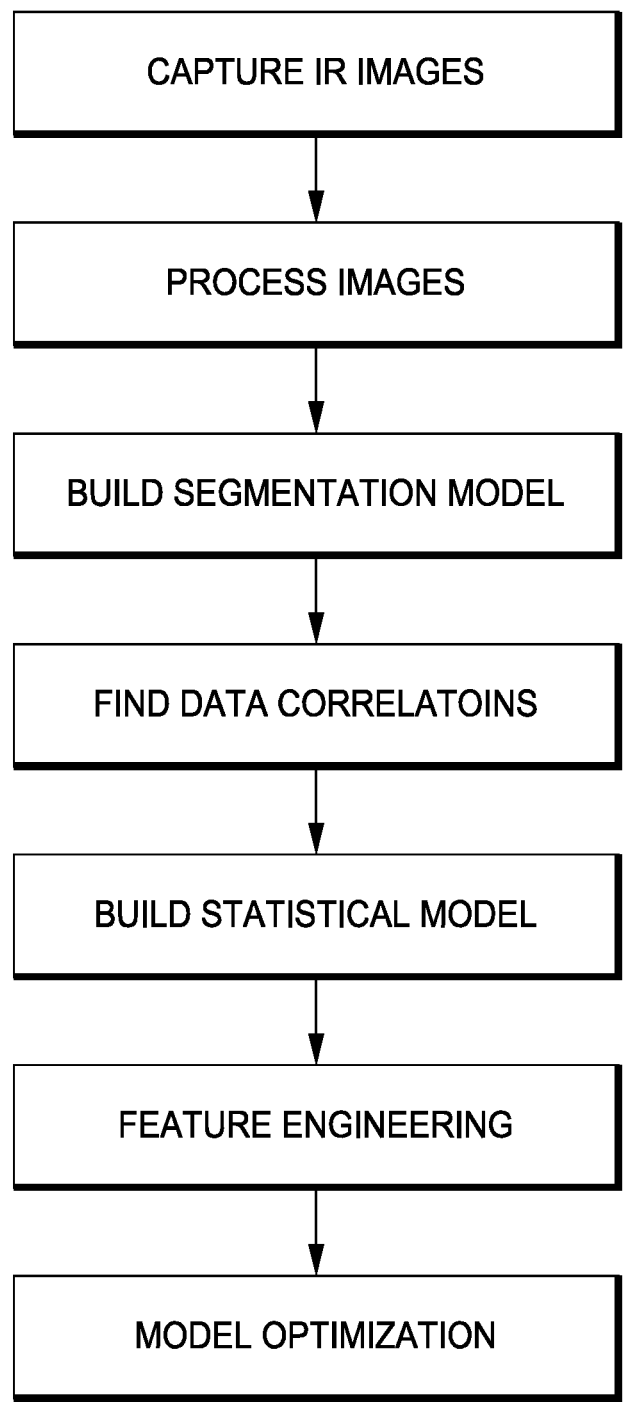
FIG. 9 is a schematic flow diagram of a process to build a model between sensor data and hive population according to an embodiment.

As schematically illustrated in FIG. 9, the data from the sensors was analyzed to determine a model between sensor data and hive population. This included processing images, segmenting images, exploratory data analysis, statistical modeling, feature engineering, model optimization, and performance testing.

The first step in the analysis chain is to process the images into a useful form for modeling. The irradiance data is extracted from the metadata of the image file created by the IR image sensor. Software is then used to extract and format the metadata from the image file. The software also calculates the temperature values from radiance data contained in the image file.

The next step is to build a segmentation model that can identify the beehive within the visual image. The IR image sensor used has two cameras, one infrared and one visual, that capture images simultaneously. The present inventors started with Mask_RCNN, a deep learning model commonly used for image recognition that detects objects in an image while simultaneously generating a high-quality segmentation mask for each instance. The model attempts to find a box in the image, which is well-suited for beehives. The segmentation model was improved and trained to meet the needs of the analysis. The model was trained using 1992 beehive images to develop its accuracy in locating a beehive within an image. This involved using the images sourced from Google Images and GIMP to define and store data on where the hive was in the image.

While training the model, it was determined that the hive lids and entrances skewed temperature data, so the segmentation model was improved to exclude lids and entrances. The model was optimized for hive detection so it didn't overfit the data. Because the segmentation model only needed to classify whether the image was a hive or not, which involves simpler operations, all of the algorithm layers in the RCNN model were not trained; the main layer of analysis was enough for accurate hive detection.

The segmentation model categorizes pixels as "hive" or "not hive". This results in a shape cropped out of the visual image that is then applied to the thermal image to pull the relevant temperature values and exclude pixel values depicting background objects. To do this, a script was built to align the position and size of the visual image with the thermal image. This model accurately classifies each pixel 93.6% of the time.

The first step of modeling was to look at the temperature statistics (mean, median, range, standard deviation) distributions from the hive images and find a correlation with manually collected colony size data. The relationship between these two datasets was analyzed over the course of a day, and it was determined that a stronger relationship exists closer to sunrise.

A variety of different regression and classification models were tested to see if a relationship could be detected. In the early models, classification performed better, but as more data were collected, regression began performing better. For classification, categories were created to correspond with different levels of colony strength. This technique results in a loss of information because frames of bees are closer to a continuous variable than a category. The updated regression model can more closely output a representation of each hive's strength. The improvement over time of the regression model was due to incorporating feature engineering improvements (discussed below) and additional data.

As part of the feature engineering, the model included weather data (Table 3). Ambient factors were incorporated into the model to account for external heat sources affecting the hive's infrared heat signature.

TABLE 3

| Feature | Importance |
| --- | --- |
| Temp entropy | 30.52% |
| Hive temp | 28.76% |
| Power | 10.18% |
| Temp: Area | 9.11% |
| Solar time | 6.94% |
| Temp: Volume | 4.44% |
| Ambient temp | 2.99% |
| Wind speed | 1.88% |
| Hive area | 0.92% |
| Humidity | 0.83% |
| Dew point | 0.77% |
| Cloud cover | 0.65% |
| Time | 0.56% |
| Hive size | 0.51% |
| Visibility | 0.42% |
| Pressure | 0.23% |
| UV Index | 0.23% |
| Heat Index | 0.03% |
| Precipitation | 0.03% |
| Windchill | 0.01% |

The parameters of the models were then optimized, updating items such as the learning rate and the regularization factor, which allow the model to train more optimally to minimize error. The regression model used was a boosted model, a process which combines several weak models into one strong model. The model's performance was then evaluated. The model was first trained on a training set of 80% of the IR image and frame count data, then validated on a test set of the remaining data withheld from the model training. This helped determine how the model performs on unseen data.

To validate the data, a 1-dimensional physics-based model was created which incorporates the thermodynamics from the center of the hive out to the center of the hive wall as read from the infrared cameras. The simulated model comprised a heat flow model, and mathematical solvers were used for the differential equations. The simulated model was tested on real world data. The model was first tested using a simulated hive to get early validation of performance. In the simulated hive, Christmas lights were used as the heat source inside a beehive to test the model on the hive equipment before adding the bee complexity. The physics model matches the actual thermodynamics observed in the hive. To increase accuracy, the model takes into account the materials inside the hive.

Figure 10:
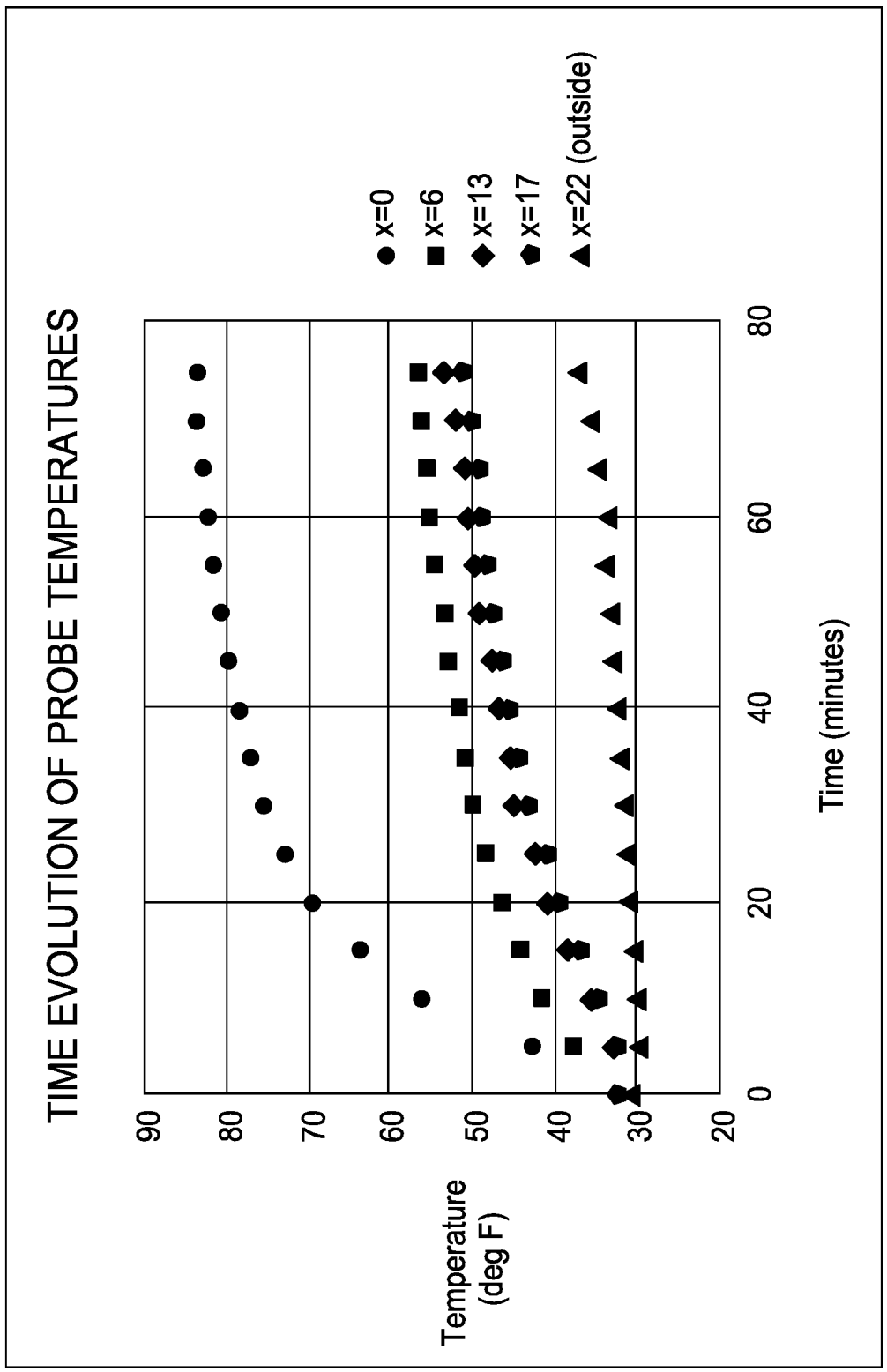
FIG. 10 is a summary of the experimental results showing the change in probe temperatures within an apiary over time according to an embodiment.
Figure 11:
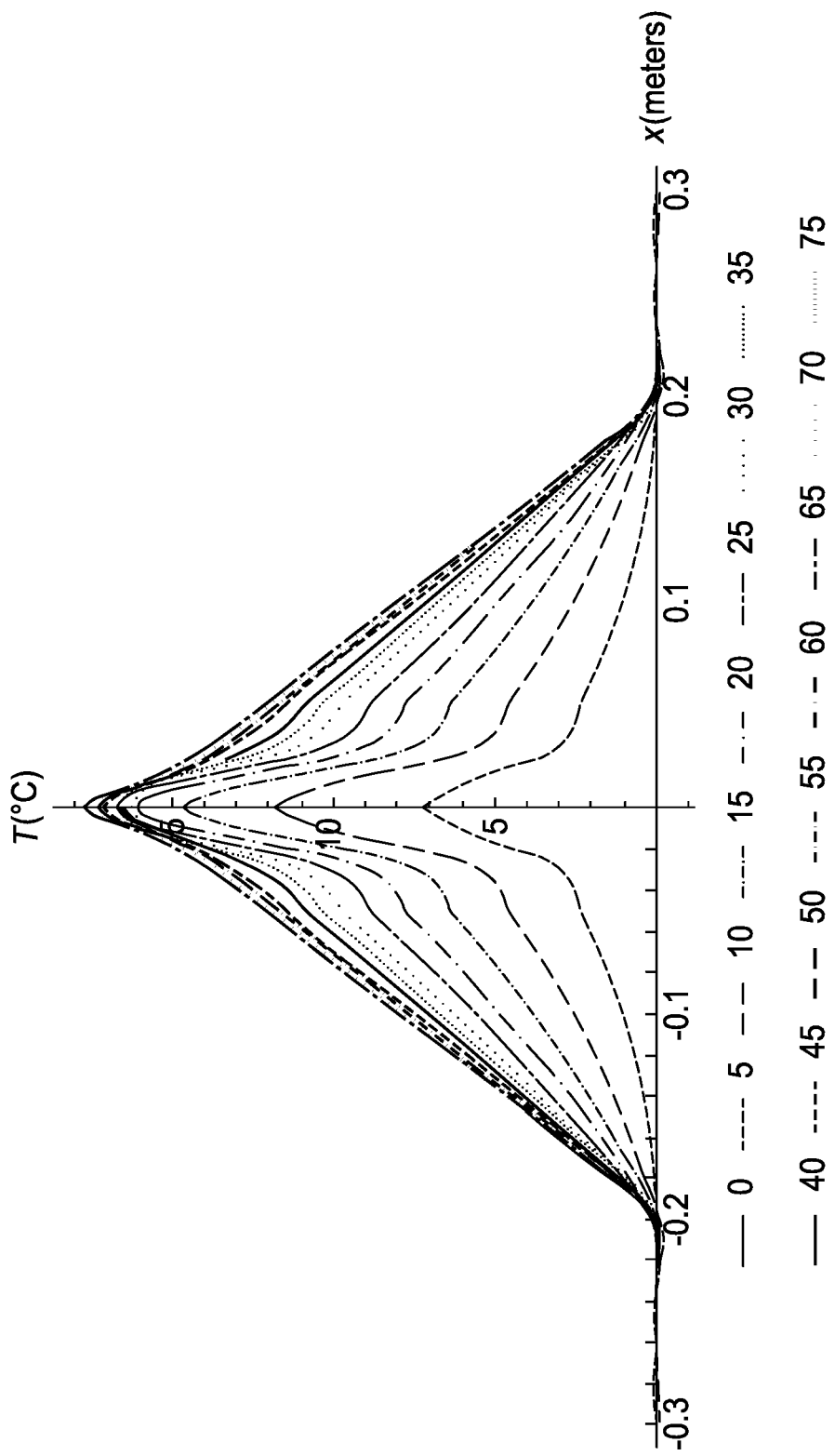
FIG. 11 is a graphical representation of the solution to heat equations based upon distance from the heat source within an apiary according to an embodiment.

To verify the 1-dimensional model, a simulated apiary is established using Christmas lights as the heat source in place of bees. In the experiments, IR pictures are taken periodically and the temperatures at important locations in the system are recorded. Temperature data was collected every five minutes via a probe, at various distances from the heat source. The experimental results are shown in FIG. 10. The results of the experiment were compared to the typical heat source distribution over time of the Christmas lights alone. Taking account of the Solar radiation distribution, material used in the hive, reflection and absorption factors of the paint color, distance from the heat source, and time, the heat equations were solved, resulting in the FIG. 11.

Figure 12:
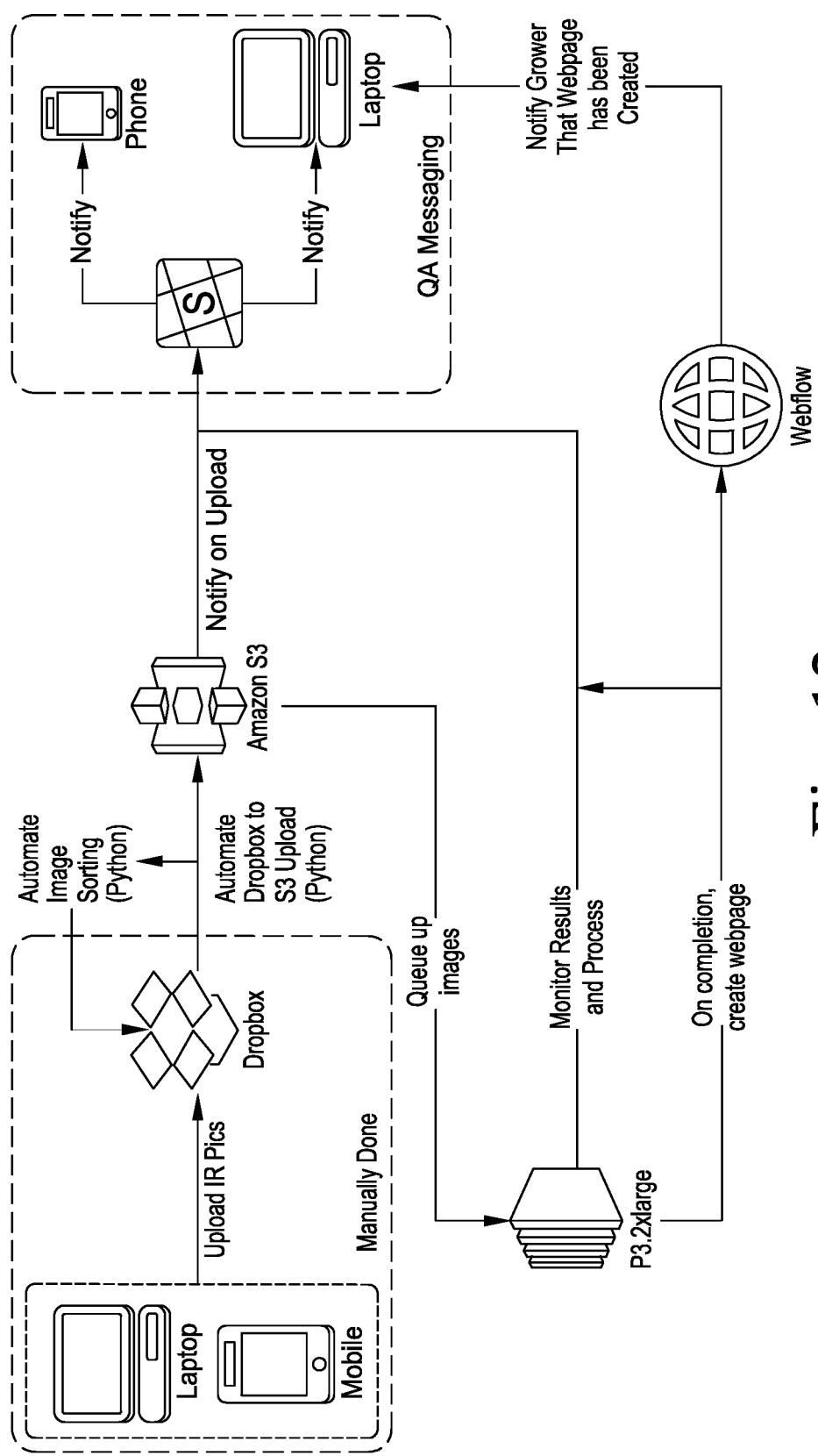
FIG. 12 schematically illustrates a system to automate the image analysis and report generation processes in an embodiment.

FIG. 12 schematically illustrates a system to automate the image analysis and report generation processes. This includes processing of IR images, running the hive strength model, and generating results in a format that growers can easily understand. In one embodiment, this system may be implemented in Amazon Web Services (AWS). The AWS technology allows subscribers to have at their disposal a virtual cluster of computers, available all the time, through the Internet. Moving the analysis models to faster computers in AWS allowed the analysis time to be much shorter than running the models on local computers.

In some embodiments, the entire software chain is not automated—only the most critical components. For example, Images may need to be manually uploaded from the IR image sensor to Dropbox, where they may then be manually pulled into AWS. In some embodiments, although there is a model for segmenting images automatically, a manual segmentation flow may be used for images that do not properly auto segment. In some embodiments, this process includes a human check to ensure the segmentation model performed well.

In some embodiments, images uploaded in the S3 bucket create notifications (SNS) that are sent to the SQS queue. This is a distributed system (n number of hosts) processing the images in tandem. A load balancer calculates the number of images and/or amount of traffic in the SQS queue, then determines how many hosts are necessary in order to process the data. These images are then processed through the segmentation model, IR metadata extraction, and prediction models. Prediction results are then sent to a server, or serverless storage solution, which also stores all metadata, user, site, hive information, picture metadata, beekeeper and grower information. The results are securely processed and sent to the users. According to an embodiment, the results are sent to the users directly. The results may also be posted to a secure portal where the user may review the results.

Figure 13:
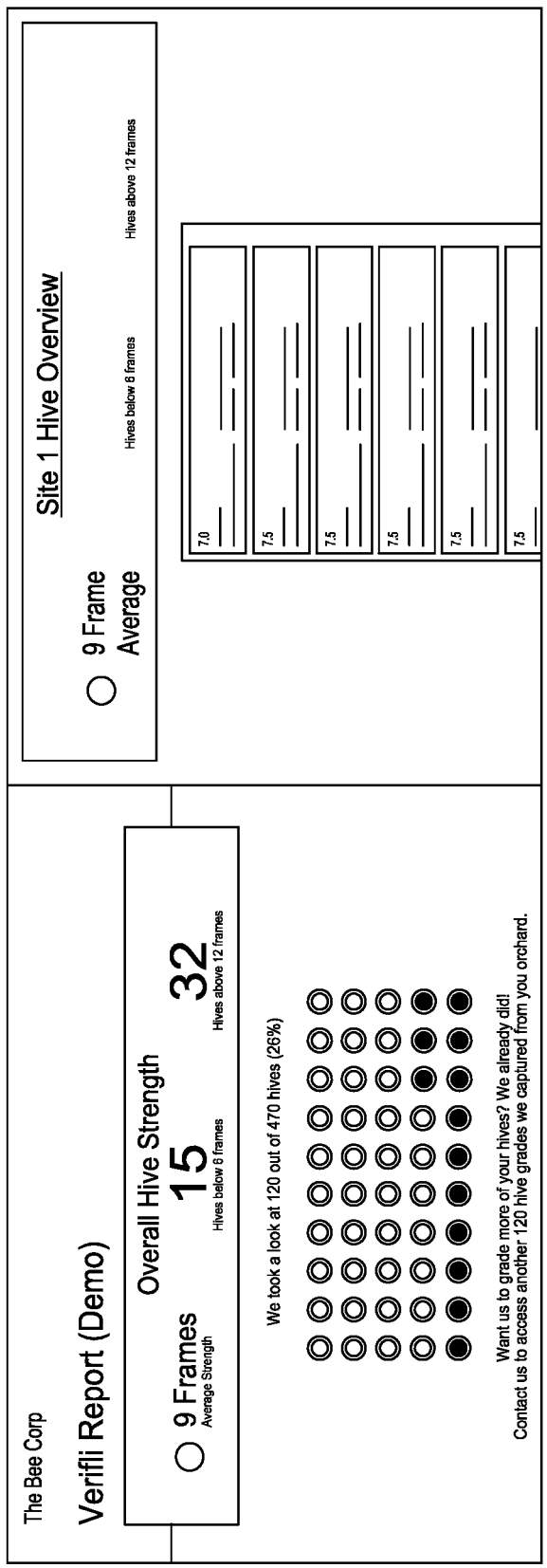
FIG. 13 illustrates one embodiment of a report to display the data generated from the model in an embodiment.

FIG. 13 illustrates one embodiment of a simple report to display the data generated from the model in a format that is easy for growers to review their inspection results.

Example 1: A system as described herein was tested with a commercial beekeeper, during which 120 hives were sampled to determine whether the image capture process worked and how the model performed. Actual frame counts collected manually averaged 9.02 frames across all 120 hives, and the model estimated 8.92 frames.

Figure 14:
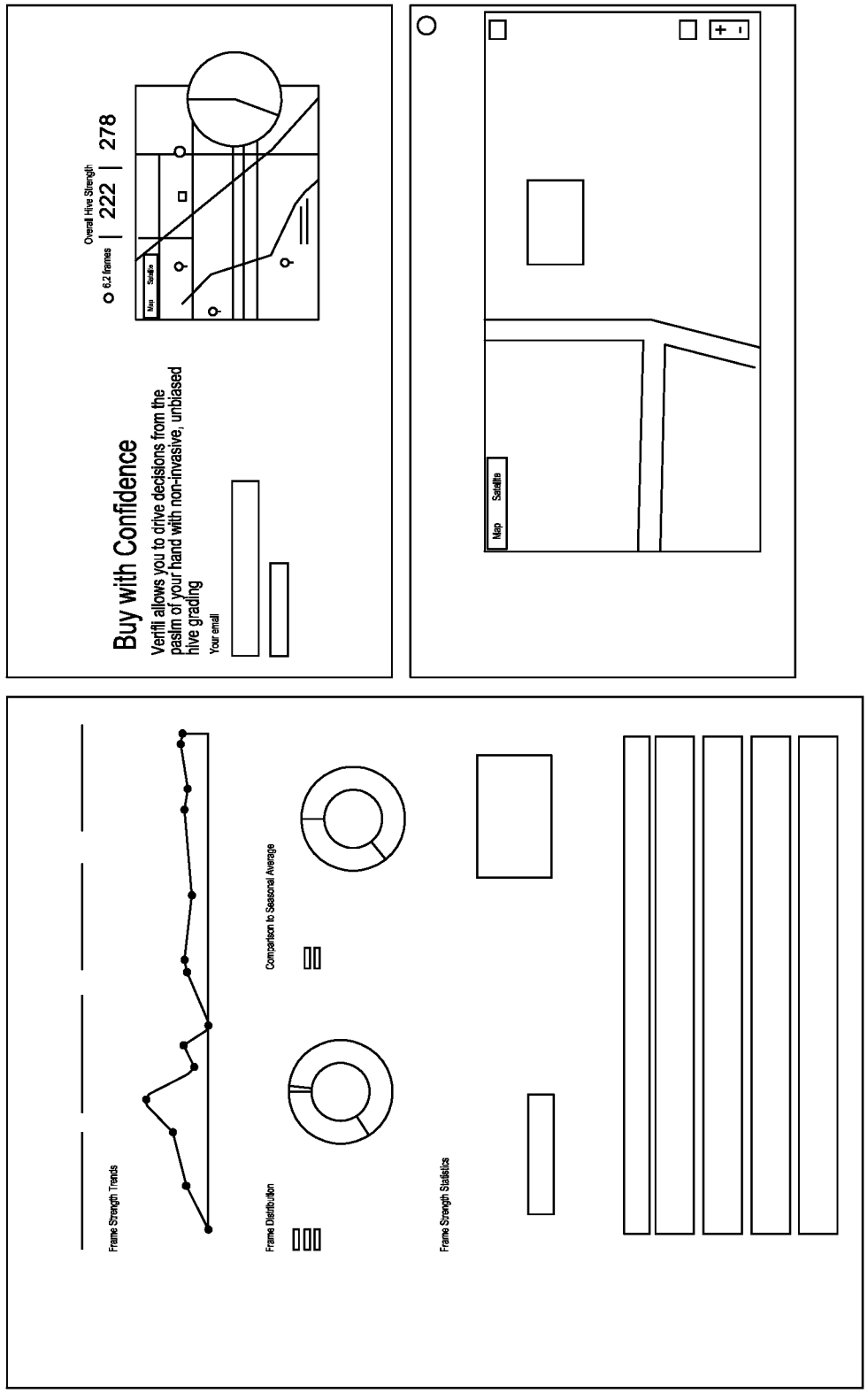
FIG. 14 illustrates an embodiment of a web application to display the data generated from the model in an embodiment.

FIG. 14 illustrates one embodiment of a web application to display the data generated from the model. According to this embodiment, frame strength data is provided over time. The web application allows users to view their results and sort by site, beekeeper, and grower. When a user selects a filter, the entire page is responsive, and the graphs update with the new data. According to an embodiment, the web application includes key summary graphs to help growers make decisions and provides a full list of individual hive results with images and all other metadata. This embodiment may also compare the user's hive strength to other hives, or to the seasonal average hive strength. According to an embodiment, the web application displays a mapping tool summarizing the strength of each hive by geographic location. The mapping tool allows users to view their strength results on a map, so they can see how weak and strong colonies are distributed through the orchard. The map displays marker colors based on hive size, and detailed information is provided when clicking upon an individual marker.

Figure 15:
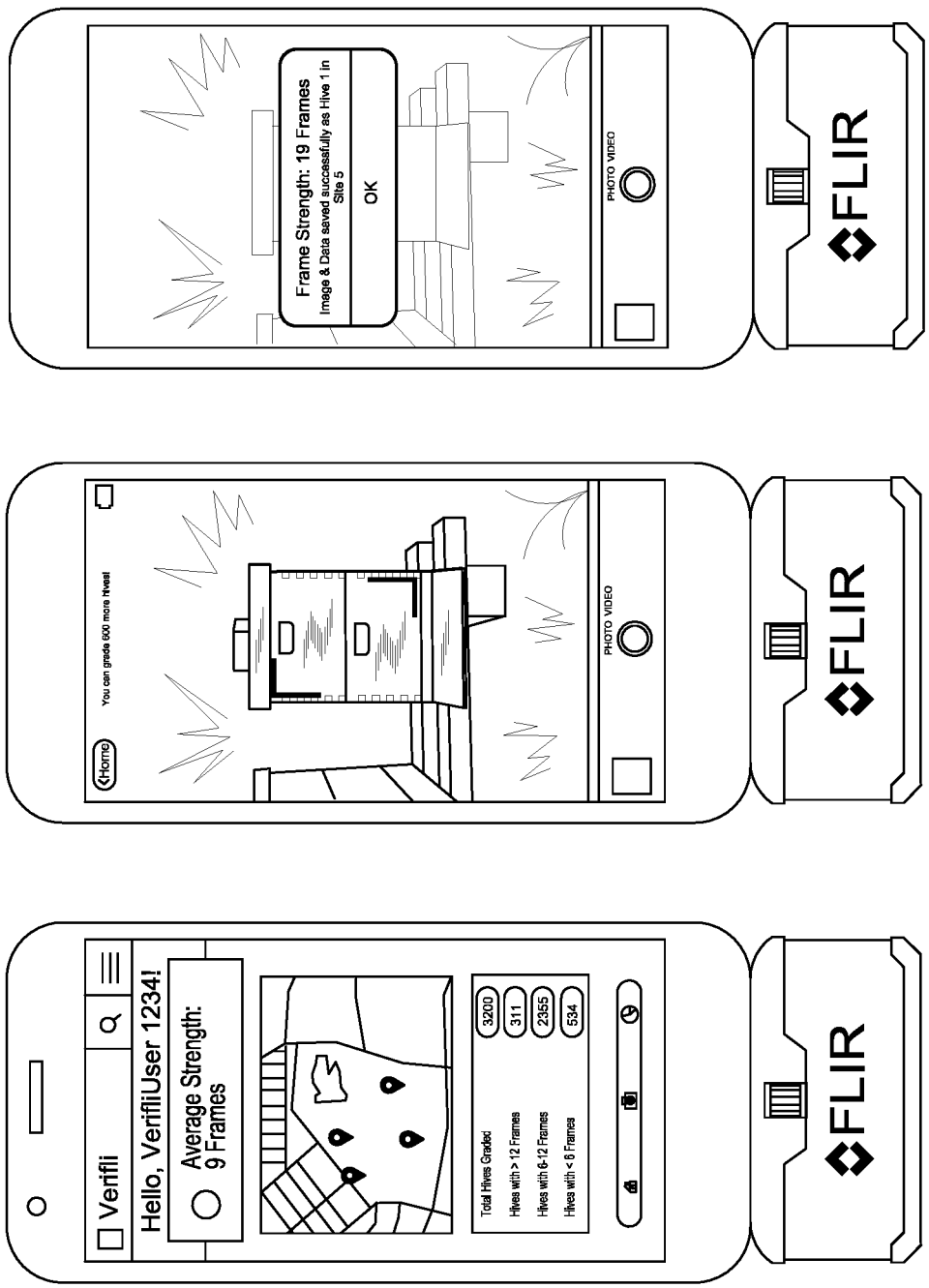
FIG. 15 shows several screen displays of a user-facing mobile application in an embodiment.
Figure 16:
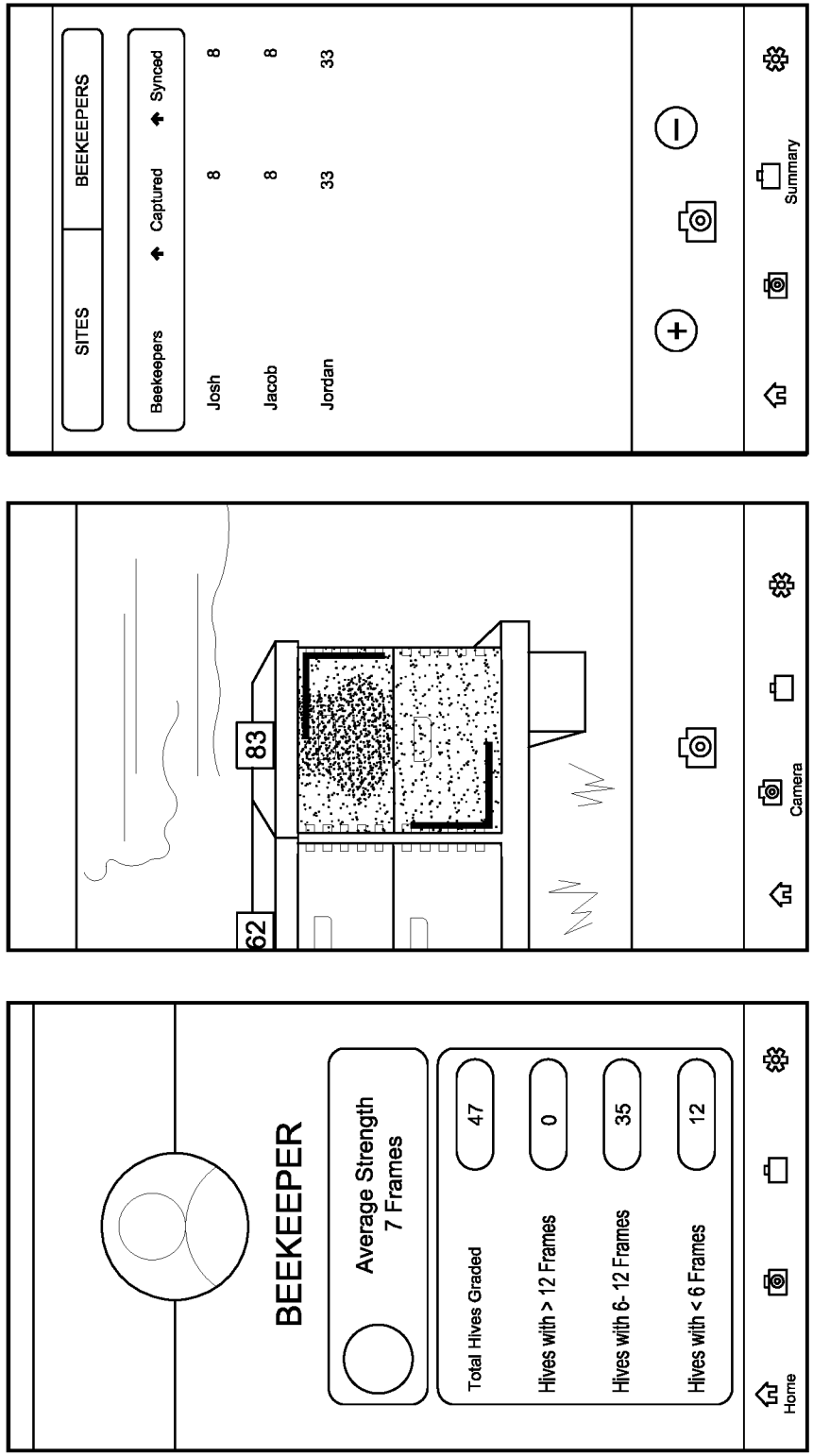
FIG. 16 shows several other screen displays of a user-facing mobile application in an embodiment.

The system disclosed herein may be packaged in an easy-to-use mobile application so that personnel associated with the hives can perform the data collection themselves. FIGS. 15 and 16 show several features of a user-facing mobile application, such as average frame strength, display on the screen during IR image capture of a bounding box to assist the user in aligning the hive within the image plane (which helps to place the user at the optimum distance from the hive for image capture), and display of site and beekeeper information as related to captured images. The mobile application runs the predictive model natively, so that frame strength results can be calculated without needing cell service or internet connection.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A system for monitoring a beehive colony population strength in a beehive contained within a space divisible into spatial portions adapted to contain portions of said beehive colony population, comprising:
   a. a sensor adapted to generate sensor data;
   b. a data communications and collection device to collect said sensor data; and
   c. a processor to:
      analyze said sensor data to determine a result indicating beehive population strength, said analysis comprising determining the number of the spatial portions within the space that are populated with bees; and
      communicate a signal reporting the analyzed sensor data.

2. The system of claim 1, wherein the sensor comprises an infrared sensor, a thermometer, a humidity sensor, a pressure sensor, or a global positioning system.

3. The system of claim 1, wherein the sensor data includes data of a type selected from the group consisting of infrared data, temperature in the hive, a humidity level, a pressure, location data, an altitude, an orientation or relative orientation, data indicative of health of one or more bees, data indicative of stress of one or more bees, beehive equipment type and pallet type.

4. The system of claim 1, where in the signal comprises a signal indicating beehive strength.

5. The system of claim 1, wherein analyzing the sensor data comprises predictively modeling changes in beehive strength based upon environmental factors and said sensor data.

6. The system of claim 1, wherein the data communications and collection device comprises a mobile computer device.

7. The system of claim 1, wherein the data communications and collection device comprises a mobile application.

8. The system of claim 1, additionally comprising a visual display adapted to display said data.

9. The system of claim 1, wherein said analysis comprises determining the number of bees in the beehive colony population.

10. A method for determining beehive colony population strength of a beehive contained within a space divisible into spatial portions adapted to contain portions of said beehive colony population comprising:
   a. generating sensor data via a sensor;
   b. communicating the sensor data to a remote data analysis computing device, the remote data analysis comprising determining the number of spatial portions within the beehive that are populated with bees so as to determine the beehive colony population strength based upon the sensor data; and
   c. reporting the remote data analysis.

11. The method of claim 10, wherein the sensor comprises an infrared sensor, a thermometer, a humidity sensor, a pressure sensor, or a global positioning system.

12. The method of claim 10, wherein the sensor data comprises data of a type selected from the group consisting of infrared data, temperature data, a humidity level, a pressure, location data, an altitude, an orientation or relative orientation, data indicative of health of one or more bees, data indicative of stress of one or more bees, beehive equipment type and pallet type.

13. The method of claim 10, wherein computing the beehive strength includes comparison of the sensor data to a predictive model indicating beehive strength.

14. The method of claim 10, wherein communicating the sensor data comprises.

15. The method of claim 10, wherein reporting the remote data analysis comprises sending the remote data analysis to an online computer application.

16. The method of claim 10, wherein reporting the remote data analysis comprises sending the remote data analysis to a mobile application.

17. A method for determining beehive colony population strength of a beehive contained within a space divisible into spatial portions adapted to contain portions of said beehive colony population, comprising:
   a. receiving sensor data by a remote data analysis computing device;
   b. analyzing, by the remote data analysis computing device, the sensor data comprising determining the number of spatial portions within the beehive that are populated with bees so as to determine beehive colony population strength; and
   c. communicating the beehive colony population strength to a user computing device.

18. The method of claim 17, wherein the sensor comprises an infrared sensor, a thermometer, a humidity sensor, a pressure sensor, or a global positioning system.

19. The method of claim 17, wherein the sensor data comprises infrared data, temperature data, a humidity level, a pressure, location data, an altitude, an orientation or relative orientation, data indicative of health of one or more bees, data indicative of stress of one or more bees, beehive equipment type and pallet type.

* * * * *